(12) United States Patent
Cadotte, Jr. et al.

(10) Patent No.: US 11,772,092 B2
(45) Date of Patent: Oct. 3, 2023

(54) BIAXIALLY ORIENTED THERMOPLASTIC PIPETTE, AND METHOD AND APPARATUS FOR FORMING SAME

(71) Applicant: CORNING INCORPORATED, Corning, NY (US)

(72) Inventors: John Claude Cadotte, Jr., Waterboro, ME (US); Michael Kurt Schaefer, Gorham, ME (US); James Mark Seymour, Portland, ME (US)

(73) Assignee: CORNING INCORPORATED, Corning, NY (US)

( * ) Notice: Subject to any disclaimer, the term of this patent is extended or adjusted under 35 U.S.C. 154(b) by 543 days.

(21) Appl. No.: 16/766,058

(22) PCT Filed: Nov. 28, 2018

(86) PCT No.: PCT/US2018/062908
§ 371 (c)(1),
(2) Date: May 21, 2020

(87) PCT Pub. No.: WO2019/108693
PCT Pub. Date: Jun. 6, 2019

(65) Prior Publication Data
US 2020/0330975 A1      Oct. 22, 2020

Related U.S. Application Data

(60) Provisional application No. 62/592,959, filed on Nov. 30, 2017.

(51) Int. Cl.
*B29C 49/04*     (2006.01)
*B01L 3/02*      (2006.01)
(Continued)

(52) U.S. Cl.
CPC ............. *B01L 3/021* (2013.01); *B29B 11/10* (2013.01); *B29C 49/0005* (2013.01);
(Continued)

(58) Field of Classification Search
CPC ............. B29C 49/62; B29C 2049/622; B29C 2049/627; B29C 2049/4879;
(Continued)

(56) References Cited

U.S. PATENT DOCUMENTS 3,078,508 A * 2/1963 Martin, Jr. ............. B29C 49/18
                                                       264/529
3,186,818 A * 6/1965 Havens .................. B29C 49/48
                                                       65/169
(Continued)

FOREIGN PATENT DOCUMENTS

AU      200138898      11/2001
CN      207546548 U    6/2018
(Continued)

OTHER PUBLICATIONS

Machine translation of DE 10 2015 110 681 A1 dated Jan. 2017. (Year: 2017).*
(Continued)

*Primary Examiner* — Robert B Davis
(74) *Attorney, Agent, or Firm* — Chandra J. Duncan

(57) ABSTRACT

Unitary measuring pipettes include a tubular body of biaxially oriented thermoplastic material, together with size reduction, elimination, and/or reorientation of longitudinally spaced, raised circumferential witness features, to mitigate or avoid interference between such witness features and graduated volumetric markings on an outside surface of the tubular body. Methods and apparatus for vacuum forming of unitary measuring pipettes are also provided. Gas permeable apertures or pores having a maximum width of no greater than 150 microns, in ranges of 10-100 microns, 10-50 microns, or subranges thereof, may be defined in face plates or inserts received by mold blanks, or defined in molding surface of cooperating mold bodies, and may be used to produce a tubular pipette body having reduced height wit-
(Continued)

ness features. Cooperating mold bodies may each be produced from multiple mold body sections with gas passages defined therein and/or therebetween.

17 Claims, 34 Drawing Sheets

(51) Int. Cl.
    *B29B 11/10*     (2006.01)
    *B29C 49/00*     (2006.01)
    *B29K 101/12*     (2006.01)

(52) U.S. Cl.
    CPC ........... *B29C 49/04* (2013.01); *B01L 2200/12* (2013.01); *B01L 2300/028* (2013.01); *B01L 2300/0838* (2013.01); *B01L 2300/0858* (2013.01); *B01L 2300/12* (2013.01); *B29K 2101/12* (2013.01); *B29K 2995/0053* (2013.01)

(58) Field of Classification Search
    CPC ........... B29C 49/48185; B29C 67/0014; B01L 3/021; B01L 2200/12
    See application file for complete search history.

(56) References Cited

U.S. PATENT DOCUMENTS

| | | | |
|---|---|---|---|
| 4,872,827 A * | 10/1989 | Noda | B29C 49/4823 249/141 |
| 5,494,432 A * | 2/1996 | Coggins | B29C 45/2626 425/572 |
| 6,527,538 B1 | 3/2003 | Pickutoski et al. | |
| 7,157,041 B2 | 1/2007 | Fitzell | |
| 7,306,448 B2 | 12/2007 | Neubauer et al. | |
| 2002/0179613 A1 | 12/2002 | Matsui et al. | |
| 2005/0051920 A1* | 3/2005 | Thomson | B29C 37/0028 425/96 |
| 2015/0029586 A1 | 1/2015 | Martins et al. | |
| 2018/0280966 A1 | 10/2018 | Cadotte et al. | |

FOREIGN PATENT DOCUMENTS

| | | | |
|---|---|---|---|
| DE | 102013226906 A1 * | 7/2015 | ............ B29C 49/62 |
| DE | 102015110681 A1 * | 1/2017 | |
| EP | 1923200 A1 | 5/2008 | |
| JP | 2006-326258 A | 12/2006 | |
| KR | 10-1398572 B1 | 5/2014 | |
| WO | 2008/065946 A1 | 6/2008 | |
| WO | 2016/200849 A1 | 12/2016 | |
| WO | 2017/091540 A1 | 6/2017 | |
| WO | 2018/217654 A1 | 11/2018 | |

OTHER PUBLICATIONS

Machine translation of DE 10 2013 226 906 A1 dated Jul. 2015. (Year: 2015).*
Bill Dundas: "Porous Steel Improves Mold Venting", Modern Machine Shop, vol. 74, No. 7, Dec. 15, 2001, 64 pages.
International Search Report and Written Opinion of the International Searching Authority; PCT/US2018/062908; dated Jan. 24, 2019; 16 Pages; European Patent Office.

* cited by examiner

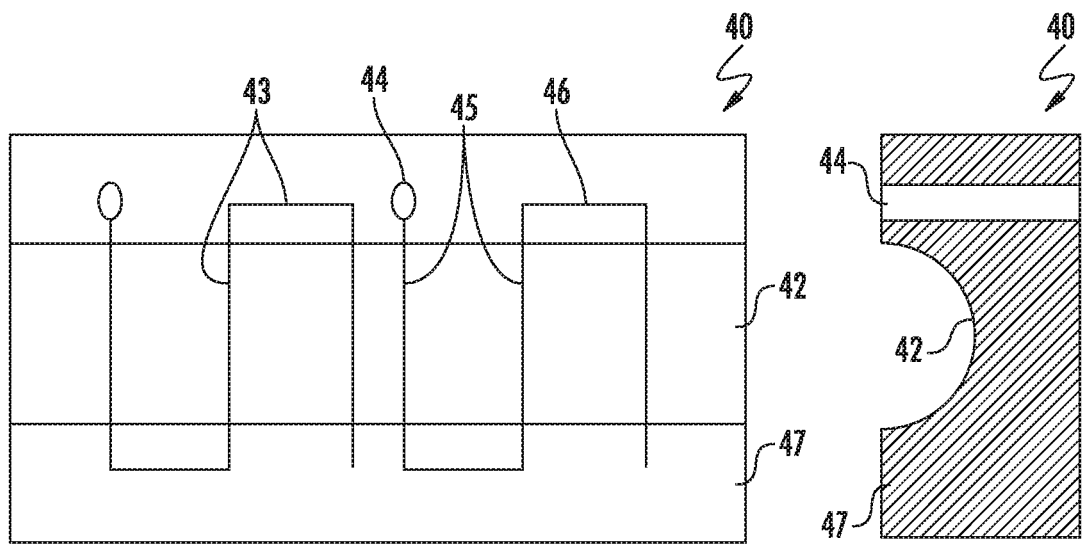
FIG. 2A
RELATED ART
FIG. 2B
RELATED ART
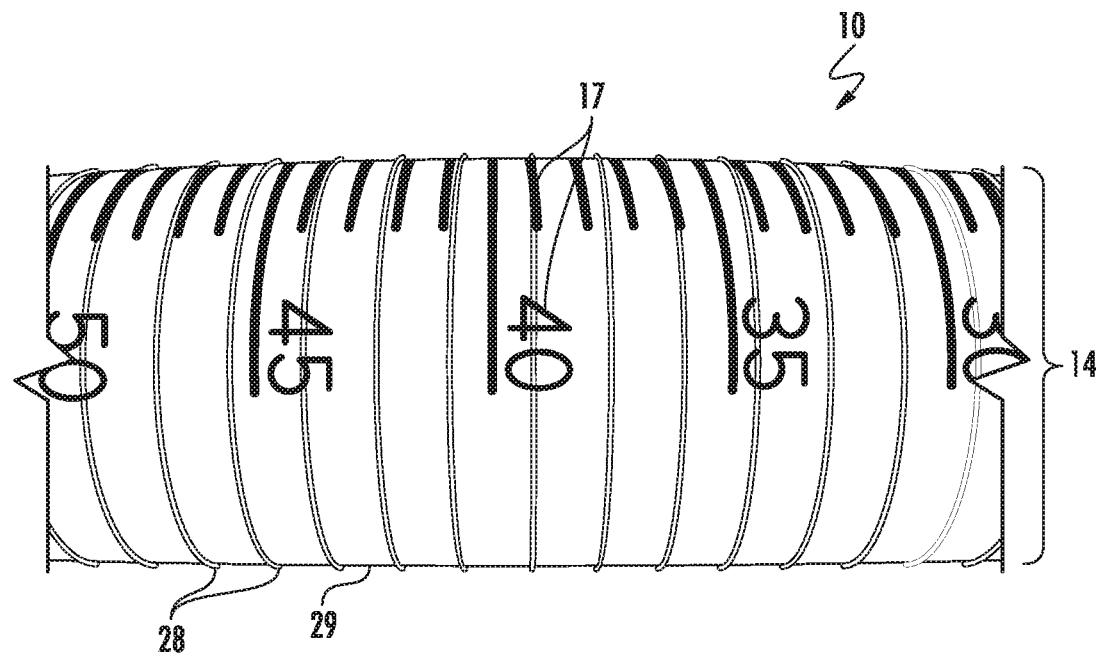
FIG. 3
RELATED ART

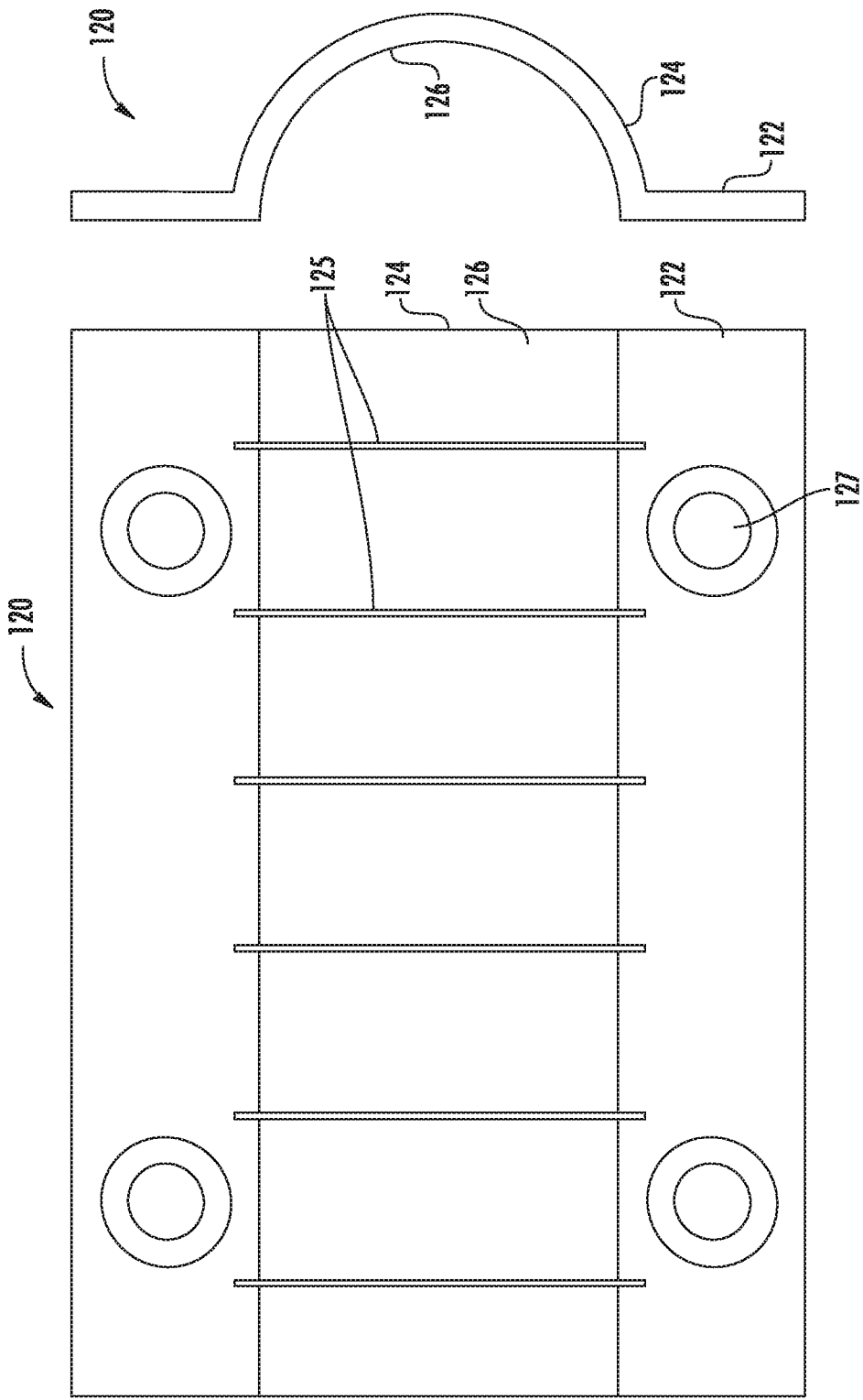

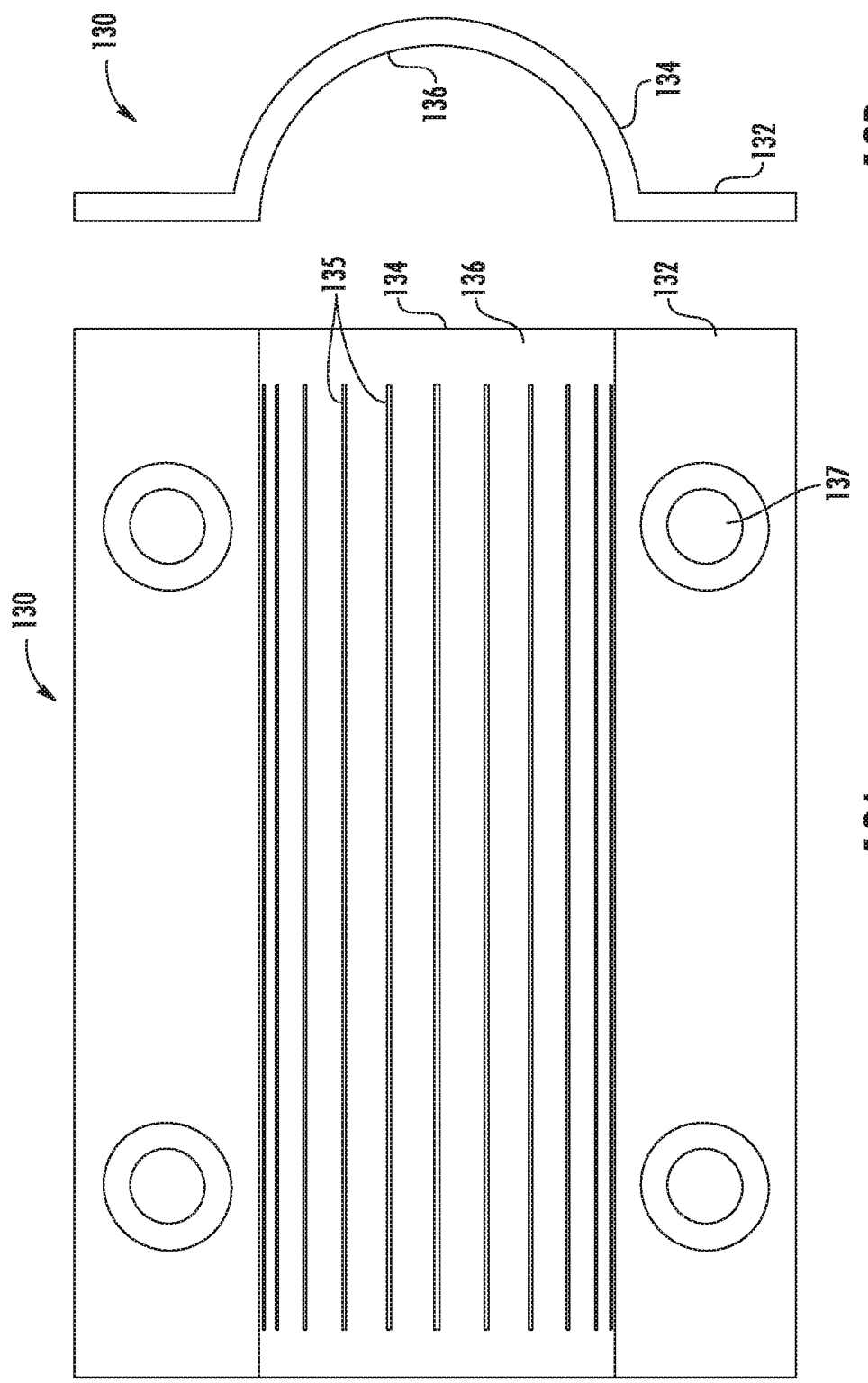

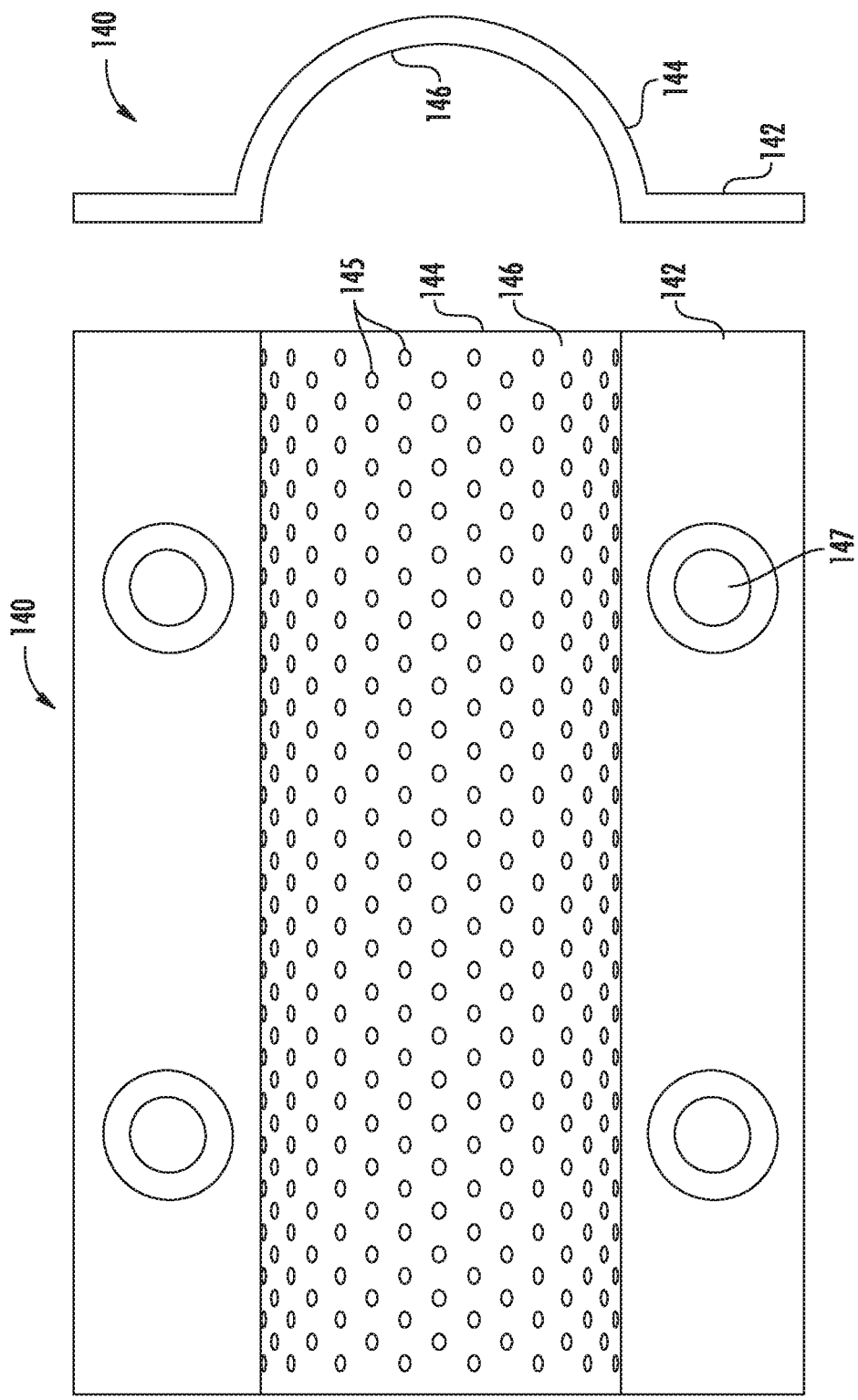

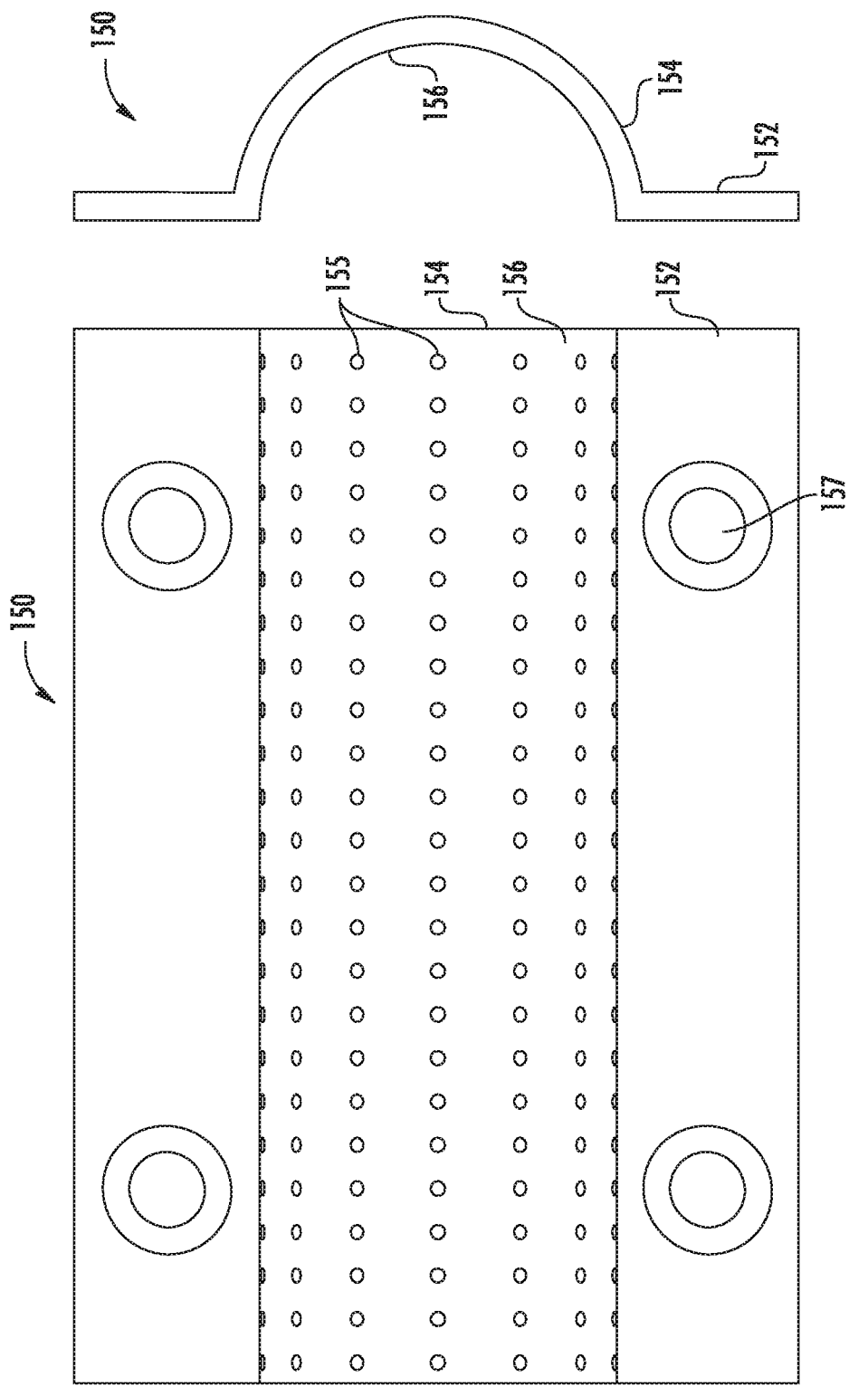

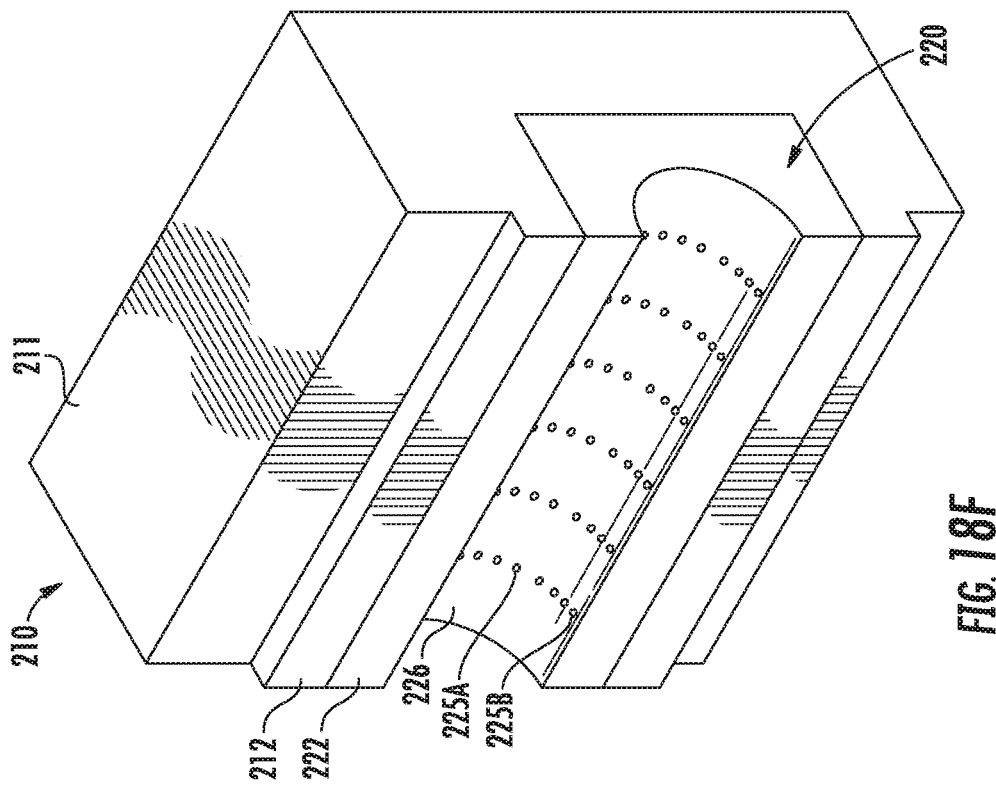
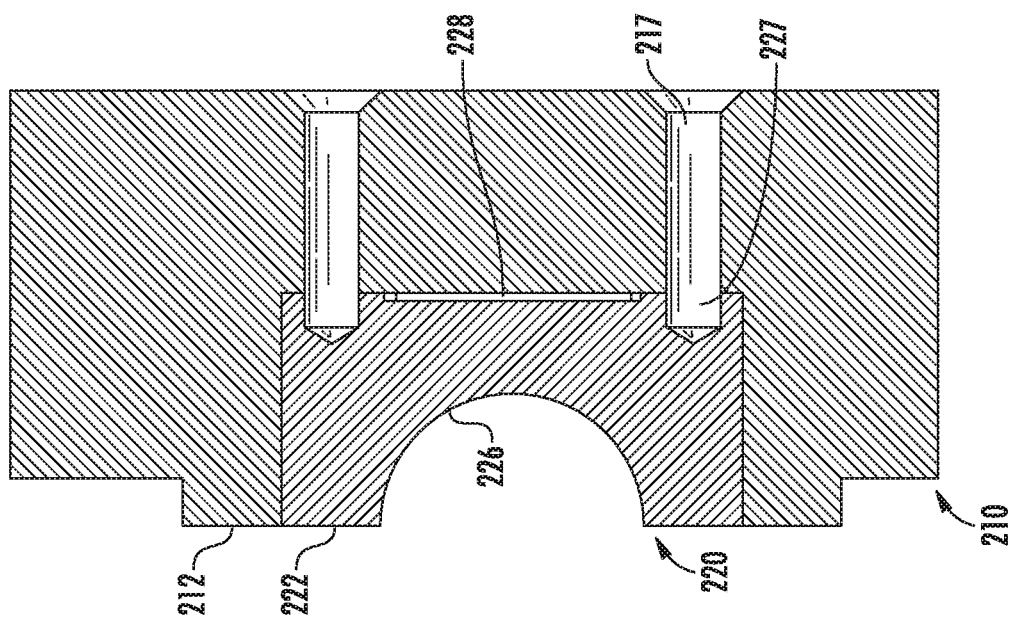
FIG. 18E
FIG. 18F

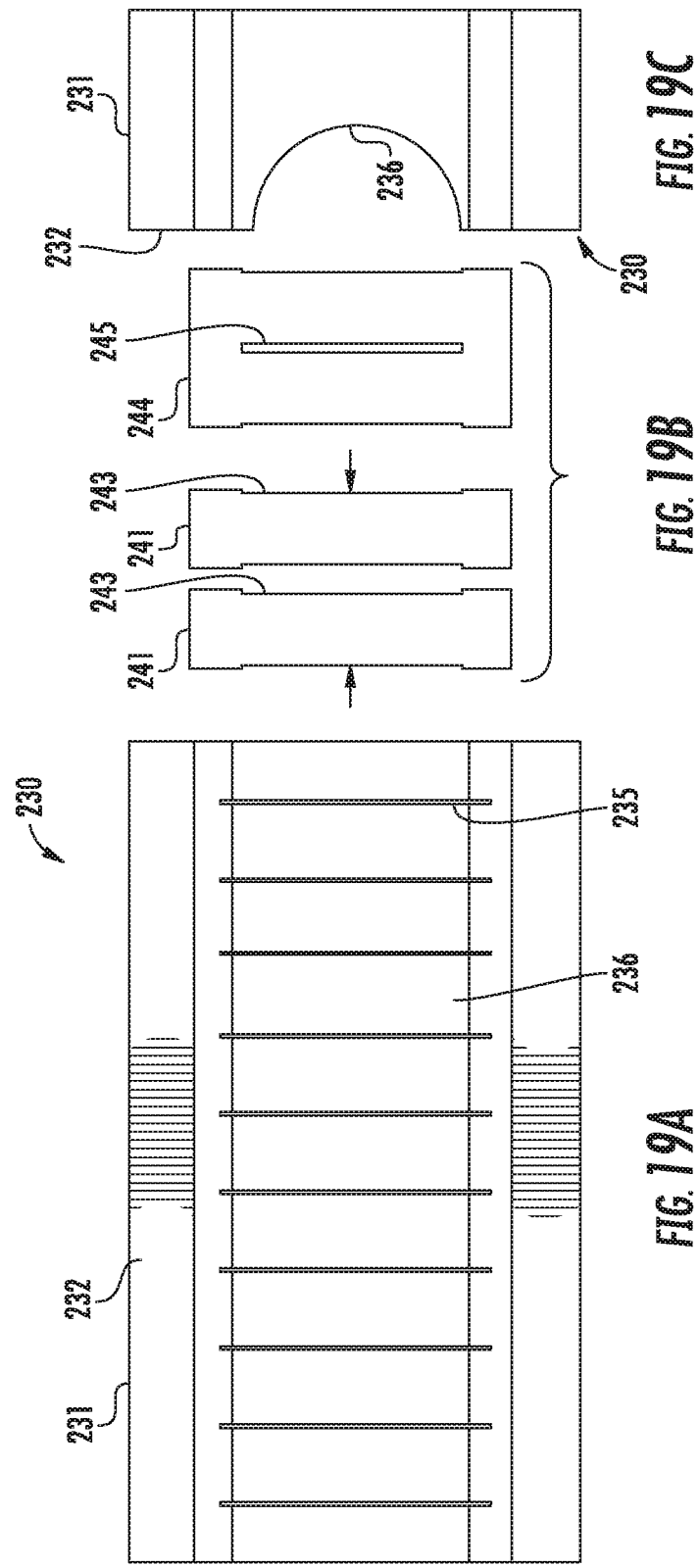

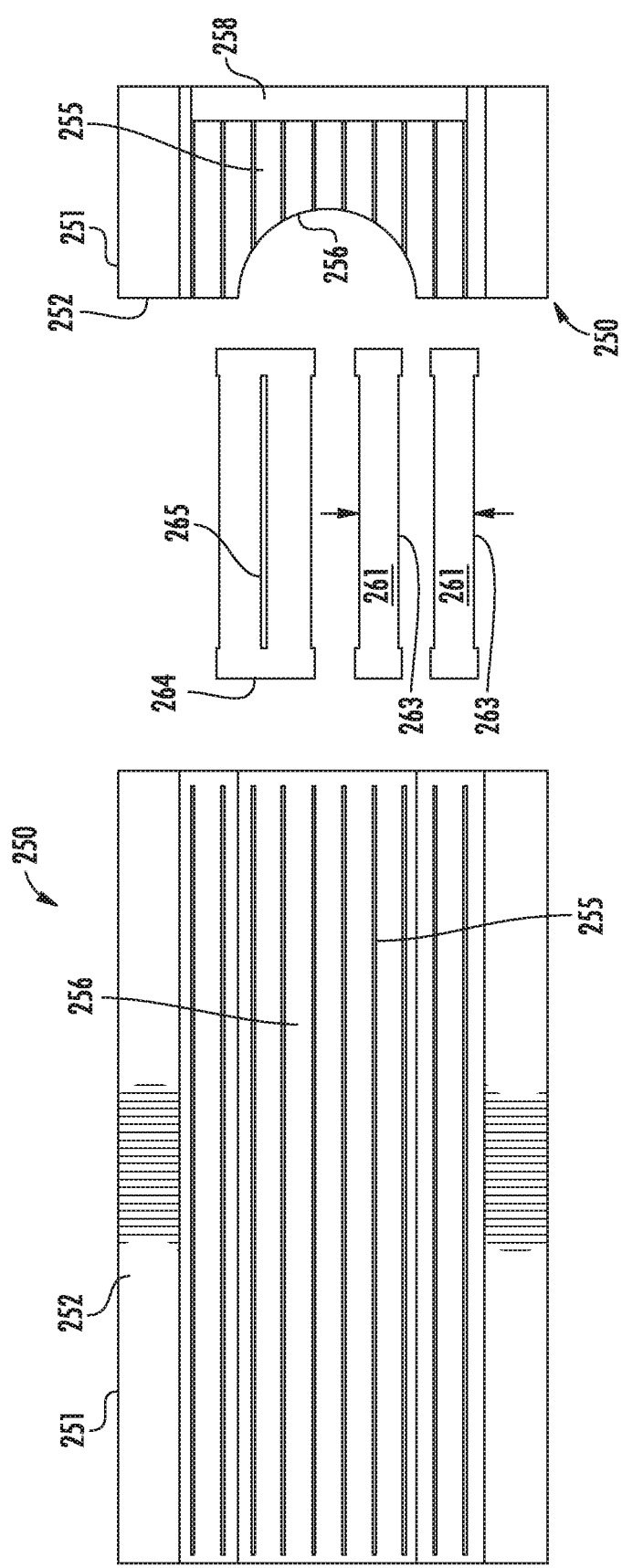

US 11,772,092 B2

BIAXIALLY ORIENTED THERMOPLASTIC PIPETTE, AND METHOD AND APPARATUS FOR FORMING SAME

CROSS-REFERENCE TO RELATED APPLICATION

This application claims the benefit of priority under 35 U.S.C. § 120 of U.S. Provisional Application Ser. No. 62/592,959 filed on Nov. 30, 2017, the content of which is relied upon and incorporated herein by reference in its entirety.

FIELD

The present disclosure relates generally to unitary measuring pipettes, as well as methods and apparatuses for forming the same by, for example, vacuum forming.

BACKGROUND

Pipettes are well-known tubular devices that usually have openings at both ends, and are designed to dispense measured quantities of liquids. Pipettes have had widespread usage in a number of industries where accurate measurement and delivery of fluids are required, particularly the medical and laboratory testing and analysis fields. Measuring pipettes typically embody straight glass or plastic tubes with one tapered end, and are calibrated into small divisions so that various amounts of liquid can be measured with the same pipette. Measuring pipettes include Mohr pipettes (with graduation marks that end before tapering begins proximate to the tip) and serological pipettes (with graduation marks that continue to a tapering region proximate to the tip).

Multiple different methods exist for fabricating pipettes, including (i) welding mouthpiece and tip components to a hollow tube, (ii) reheating a thick tube followed by drawing down and trimming the pipette at one or both ends to form a tip and mouthpiece, and (iii) molding with application of a pressure differential, including vacuum forming and blow molding. Each of these methods entails tradeoffs with respect to cost, quality, and/or performance. Method (i) results in formation of weld seams that may create undesirable residue or particulate in the resulting pipette, and may also create bumps or ridges that may accumulate fluid and contaminants inside a pipette. Method (ii) entails significant variability in tip and mouthpiece openings and quality. Method (iii) is capable of reproducibly producing high quality pipettes free of weld seams, but such method typically results in formation of longitudinally spaced, raised circumferential ring shapes or ribs (i.e., witness features resulting from incursion of softened material into gas escape passages) along an exterior surface of a tubular pipette body, wherein such ring-shaped witness features tend to obscure clarity and readability of graduation lines printed on an exterior of the body.

Examples of molding with application of a pressure differential according to method (iii) to form pipettes are disclosed in International Publication No. WO 2017/091540 A1 entitled "Unitary Serological Pipette and Methods of Producing the Same," which is assigned to Corning Incorporated and is hereby incorporated by reference herein. An exemplary pipette 10 that may be produced according to such a method is shown in FIG. 1A, with the pipette 10 including a mouth region 12, a body region 14, and a tip region 16, with magnified portions of the foregoing regions shown in FIGS. 1B-1D, respectively. (FIGS. 1A-1D correspond to figures contained in International Publication No. WO 2017/091540 A1.) Each of the mouth region 12, the body region 14, and the tip region 16 may have a corresponding wall thickness (namely, a mouth thickness 22, a body thickness 24, and a tip thickness 26) and a corresponding diameter (namely, a mouth diameter 32, a body diameter 34, and a tip diameter 36). FIGS. 1B-1D also show the pipette 10 as having an inner curved surface 11 that encloses a space 18. Referring to FIG. 1A, the pipette 10 includes a mouth 13 and a tip 15 that are aligned along a longitudinal axis, and may further include a filter 19 proximate to the mouth 13. Optionally, the pipette 10 may have a mouth-body transition region 20 between the mouth region 12 and the body region 14, as well as a body-tip transition region 21 between the body region 14 and the tip region 16. In certain implementations, a substantially smooth inside surface 31 is provided in the transition regions 20, 21 to reduce retention of fluid and/or particulate material. The pipette 10 may also include a series of graduated volumetric markings 17 printed (or imprinted) along an outside surface 30 of (at least) the body region 14 to indicate a volume of liquid contained in the space 18 within the pipette 10. The pipette 10 may be sized to hold a particular volume of liquid (e.g., 1 mL, 2 mL, 5 mL, 10 mL, 25 mL, 50 mL, 100 mL, or another desired volume). The pipette 10 may be manufactured of any suitable materials, such as glass or polymers (e.g., polystyrene, polyethylene, or polypropylene).

Optionally, the mouth thickness 22, the tip thickness 26, or both the mouth thickness 22 and the tip thickness 26, may be similar to the body thickness 24. In certain implementations, one, some, or all of the mouth thickness 22, the tip thickness 26, and the body thickness 24 may be between in a range of from 0.25 mm to 2.5 mm, or from 0.4 mm to 1.5 mm, or from 0.6 mm to 1.0 mm. Enhanced thickness in the mouth and tip regions 12, 16 may provide certain advantages, such as by making such regions more resistant to damage or breakage during use. The mouth, body, and tip diameters 32, 34, 36 may each be measured externally (e.g., between opposing points on an outer surface of the pipette 10). Optionally, the body diameter 34 may be greater than either the mouth diameter 32 or the tip diameter 36. The specific body diameter 34 may depend on the volume of liquid the pipette 10 is sized to hold. In certain embodiments, the body diameter may be in a range of from about 4.0 mm to about 25.0 mm.

Fabrication of the pipette 10 by molding with application of a pressure differential may include supplying a heated parison (e.g., a tube or perform, typically in the shape of a hollow cylinder) into a mold, and creating differential pressure between an interior and an exterior of the parison to cause the parison to expand and conform to a cavity of the mold. This differential pressure may be created by either supplying pressurized gas (e.g., compressed air at 0.05 to 1.5 MPa) into an interior of the parison, or by generating subatmospheric pressure conditions (also known as vacuum conditions, e.g., at a pressure of 0.01 to 0.09 MPa) along surfaces defining the cavity of the mold. Either case requires the presence of passages in surfaces of the mold to permit the escape of gas between an exterior of the parison and the cavity, to enable expansion of the heated parison. Typically, circumferential channels are formed in curved surfaces of a mold (e.g., in corresponding mold halves) to serve as gas escape passages during a molding operation. After sufficient cooling of the expanded material (now embodied in a pipette), the mold is opened, the pipette is ejected, and the mold may receive another heated parison to repeat the process. Forming a pipette by molding with application of a pressure differential may enhance the strength and toughness of the pipette due to biaxial expansion of the material during the molding process.

FIG. 2A is an elevation view illustration of a mold half 40 including a curved molding surface 42 that defines multiple recessed channels 43 therein, with these recessed channels 43 being in fluid communication with gas escape ports 44. Each recessed channel 43 typically includes width and depth dimensions of at least about 0.3 mm. Each recessed channel 43 may include multiple transverse recessed channel segments 45 extending generally along the curved inner surface 42, with the transverse recessed channel segments 45 being connected by longitudinal channels 46 not bordering the curved molding surface 42. Multiple transverse recessed channel segments 45 and longitudinal channels 46 may be associated with a single gas escape port 44. The mold half 40 further includes a mating surface 47 intended to abut a mating surface of another mold half (not shown) to enclose an interior of a mold, with the curved molding surface 42 being arranged to contain expansion of a heated parison upon application of differential pressure thereto. Upon mating together of two mold halves consistent with the design of mold half 40, transverse recessed channel segments 45 of each mold half 40 may be registered with one another to form channels or grooves. FIG. 2B is a cross-sectional illustration of the mold half 40 of FIG. 2A, showing the curved molding surface 42 and the mating surface 47 as well as a gas escape port 44.

Following fabrication of a pipette using the above-described method with mold halves defining registered transverse recessed channel segments (e.g., of width and depth dimensions of at least about 0.2-0.3 mm) along a curved inner surface, a resulting pipette will exhibit longitudinally spaced, raised circumferential rings (i.e., circumferential witness features) along an exterior surface of the tubular pipette body. FIG. 3 illustrates a central portion of a pipette 10 including a tubular body region 14 with multiple longitudinally spaced raised circumferential rings 28 (i.e., circumferential witness features 28) protruding outward from an exterior surface 29 of the tubular body region 14. The tubular body region 14 also includes graduated volumetric markings 17 printed (or imprinted) on the exterior surface 29. As shown, at least some volumetric markings 17 overlap the circumferential witness features 28, which may interfere with printing of the graduated volumetric markings 17 and may also distract a user from quickly and accurately reading fluid volumes using the graduated volumetric markings 17.

Given the foregoing, there is a need for pipettes free of the aforementioned shortcomings, as well as a need for improved methods and apparatuses for producing pipettes.

SUMMARY

Unitary measuring pipettes (e.g., serological pipettes), as well as methods and apparatuses for forming unitary measuring pipettes by vacuum forming, are provided herein. Provision of gas permeable apertures or pores having a maximum width or diameter of no greater than 150 microns (or in a range of from 10 to 100 microns, or in a range of from 10 to 50 microns), in face plates or inserts cooperating with mold blanks of a first apparatus for vacuum forming a hollow tubular body of a pipette enables formation of tubular pipette body with reduction in height or elimination of features that are non-parallel to the longitudinal axis and that protrude from an exterior surface of the tubular body. Similarly, provision of vacuum passages having a maximum width of no greater than 150 microns (or in a range of from 10 to 100 microns, or in a range of from 10 to 50 microns), extending through semi-cylindrical molding surfaces of first and second mold bodies of a second apparatus for vacuum forming a hollow tubular body of a pipette enables formation of a tubular pipette body having reduced height witness features. A pipette producible by a method such as vacuum forming using an apparatus disclosed herein may include a tubular body of biaxially oriented thermoplastic material with a nominal thickness of no greater than 0.5 mm, wherein any optionally present witness features, protruding from an exterior surface of the tubular body in a direction non-parallel to a longitudinal axis thereof, comprise a reduced height (e.g., maximum height of no greater than about 0.02 mm (200 microns), or no greater than about 0.01 mm (100 microns)). A pipette including a longitudinal axis depending between a tip and mouthpiece thereof may include a body of biaxially oriented thermoplastic material, and at least three witness features radially spaced part from one another, with each witness feature having a maximum lengthwise dimension that is substantially parallel to the longitudinal axis. Formation of pipettes (e.g., via vacuum forming) with biaxially oriented thermoplastic permits wall thickness of a pipette body to be reduced. At the same time, reduction, elimination, and/or reorientation of raised circumferential witness features may mitigate or avoid interference between such witness features and graduated volumetric markings printed on an outside surface of the pipette body.

In accordance with certain aspects of the present disclosure, a pipette comprising a tubular body arranged between a tip and a mouthpiece, and having a longitudinal axis extending between the tip and the mouthpiece, is provided. The tubular body comprises a biaxially oriented thermoplastic material, and a nominal thickness of no greater than 0.5 mm. Additionally, any optionally present witness features, protruding from an exterior surface of the tubular body and having a maximum lengthwise dimension non-parallel to the longitudinal axis, comprise a height of no greater than about 0.02 mm. In certain embodiments, the tubular body may be devoid of witness features having a maximum lengthwise dimension non-parallel to the longitudinal axis.

In accordance with additional aspects of the present disclosure, a pipette comprising a tubular body arranged between a tip and a mouthpiece, and having a longitudinal axis extending between the tip and the mouthpiece, is provided. The pipette additionally comprises at least three witness features protruding from an exterior surface of the tubular body, wherein each witness feature of the at least three witness features has a maximum lengthwise dimension that is substantially parallel to the longitudinal axis, and is radially spaced apart from each other witness feature of the at least three witness features. The tubular body further comprises a biaxially oriented thermoplastic material. Optionally, the tubular body may have a nominal thickness of no greater than about 0.5 mm.

In accordance with additional aspects of the present disclosure, an apparatus for vacuum forming a hollow tubular body of a pipette is provided. The apparatus comprises a first mold blank defining at least one first vacuum channel and defining at least one first recess, and comprises a second mold blank defining at least one second vacuum channel and defining at least one second recess. The apparatus further comprises a first face plate or insert received by the at least one first recess and including a semi-cylindrical first molding surface defining a plurality of gas-permeable first apertures or pores in fluid communication with the at least one first vacuum channel. The apparatus additionally comprises a second face plate or insert received by the at least one second recess and including a semi-cylindrical second molding surface defining a plurality of gas-permeable second apertures or pores in fluid communication with the at least one second vacuum channel. Each aperture or pore of the plurality of gas-permeable first apertures or pores and of the plurality of gas-permeable second apertures or pores comprises a maximum width or diameter of no greater than 150 microns.

In accordance with additional aspects of the present disclosure, an apparatus for vacuum forming a hollow tubular body of a pipette is provided. The apparatus comprises a first mold body comprising a plurality of first mold body sections defining a semi-cylindrical first molding surface and defining a plurality of first vacuum passages extending through the semi-cylindrical first molding surface, wherein each first mold body section of the plurality of first mold body sections is arranged in contact with an adjacent at least one other first mold body section of the plurality of first mold body sections, and wherein a portion of each first mold body section is separated from the adjacent at least one other first mold body section by a different first vacuum passage of the plurality of first vacuum passages. The apparatus additionally comprises a second mold body comprising a plurality of second mold body sections defining a semi-cylindrical second molding surface and defining a plurality of second vacuum passages extending through the semi-cylindrical second molding surface, wherein each second mold body section of the plurality of second mold body sections is arranged in contact with an adjacent at least one other second mold body section of the plurality of second mold body sections, and wherein a portion of each second mold body section is separated from the adjacent at least one other second mold body section by a different second vacuum passage of the plurality of second vacuum passages. Each first vacuum passage of the plurality of first vacuum passages and each second vacuum passage of the plurality of second vacuum passages comprises a maximum width of no greater than 150 microns (or optionally, a maximum width in a range of from 10 to 100 microns, or in a range of from 10 to 50 microns).

In accordance with additional aspects of the present disclosure, methods for producing a pipette using the apparatuses described in the preceding two paragraphs is provided. Such a method comprises inserting a parison or preform into a mold bounded by the semi-cylindrical first molding surface and the semi-cylindrical second molding surface, the parison or preform having a longitudinal axis and a curved inner surface enclosing a space. The method further comprises applying subatmospheric pressure to the plurality of first vacuum passages and to the plurality of second vacuum passages, and vacuum forming the parison or preform to conform to the semi-cylindrical first and second molding surfaces, thereby producing a hollow tubular body of the pipette.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure.

BRIEF DESCRIPTION OF THE DRAWINGS

The following is a description of the figures in the accompanying drawings. The figures are not necessarily to scale, and certain features and certain views may be show exaggerated in scale or in schematic, in the interest of clarity or conciseness.

FIG. 2A is an elevation view illustration of a mold half with a curved inner surface 42 that defines multiple recessed channels 43 therein, for a molding with application of a pressure differential.

FIG. 2B is a side cross-sectional view of the mold half of FIG. 2A.

FIG. 3 is an elevation view illustration of a central portion of a pipette including circumferential rings or witness lines along an exterior surface of the tubular pipette body.

FIG. 11A is a front elevation view illustration of a face plate or insert including gas permeable apertures embodied in multiple narrow, transversely extending slots.

FIG. 11B is a side elevation view illustration of the face plate or insert of FIG. 11A.

FIG. 12A is a front elevation view illustration of a face plate or insert including gas permeable apertures embodied in multiple narrow, longitudinally extending slots.

FIG. 12B is a side elevation view illustration of the face plate or insert of FIG. 12A.

FIG. 13A is a front elevation view illustration of a face plate or insert including gas permeable apertures embodied in an array of round holes, with the array composed of offset rows of holes.

FIG. 13B is a side elevation view illustration of the face plate or insert of FIG. 13A.

FIG. 14A is a front elevation view illustration of a face plate or insert including gas permeable apertures embodied in an array of round holes embodying aligned rows of holes.

FIG. 14B is a side elevation view illustration of the face plate or insert of FIG. 14A.

FIG. 18E is a side cross-sectional view illustration of the pinhole array-defining insert and mold blank of FIGS. 18A-18D, taken along section line "F-F" of FIG. 18A.

FIG. 18F is a perspective view illustration of the pinhole array-defining insert and mold blank of FIGS. 18A-18E.

FIG. 19A is a front elevation view illustration of a mold body including vacuum passages embodied in multiple narrow, transversely extending slots previously defined as transverse recesses between individual mold body sections.

FIG. 19B provides schematic front elevation view illustrations of two mold body precursor sections defining transverse recesses, during assembly (at left) and after being joined to one another (at right), and being useable to form a mold body similar to the mold body of FIG. 19A.

FIG. 19C is a side elevation view illustration of the mold body of FIG. 19A.

FIG. 20A is a front elevation view illustration of a mold body including gas permeable apertures embodied in multiple narrow, longitudinally extending slots previously defined as longitudinal recesses between individual mold body sections.

FIG. 20B provides schematic front elevation view illustrations of two mold body precursor portions defining longitudinal recesses, during assembly (at bottom) and after being affixed to one another (at top), and being useable to form a mold body similar to the mold body of FIG. 20A.

FIG. 20C is a side elevation view illustration of the mold body of FIG. 20A.

DETAILED DESCRIPTION

Figure 1A:
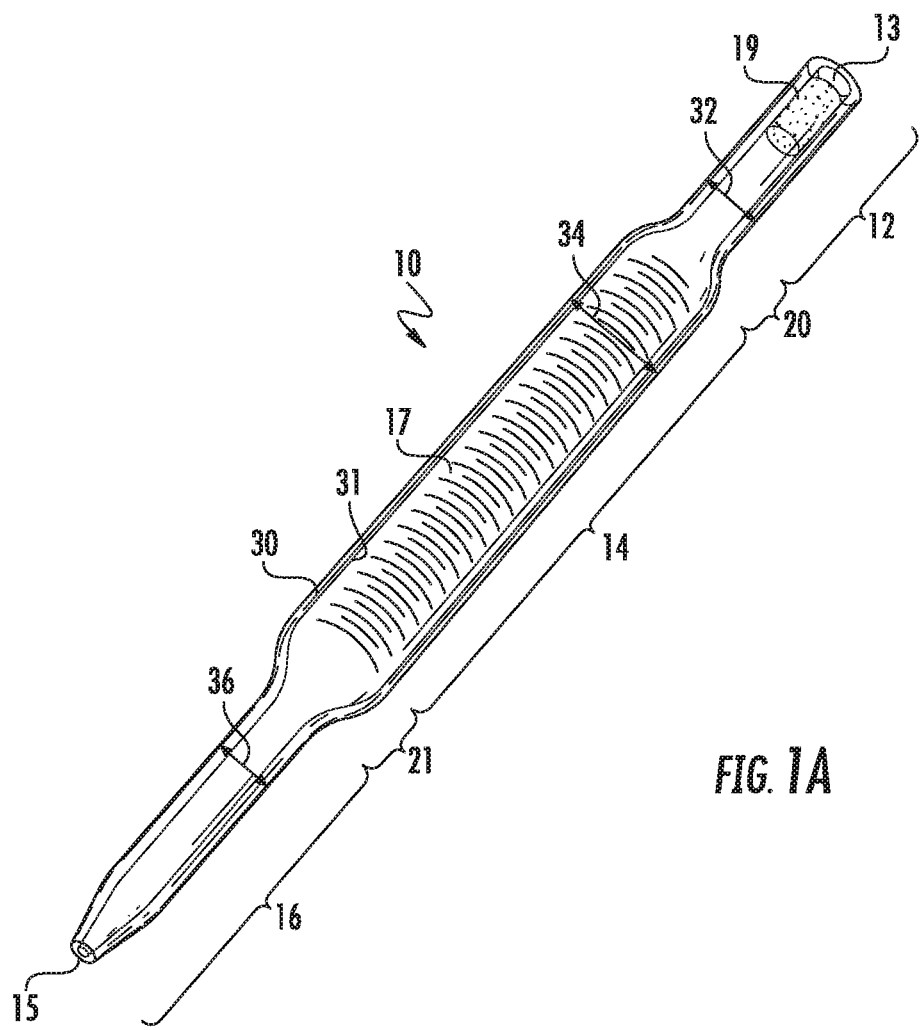
FIG. 1A is a perspective view illustration of a unitary measuring pipette with graduation marks.
Figure 1B:
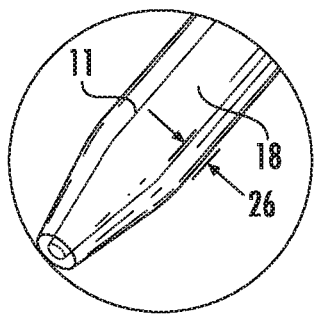
FIGS. 1B-1D provide magnified perspective views of a mouth region, a body region, and a tip region, respectively, of the pipette of FIG. 1A.
Figure 1C:
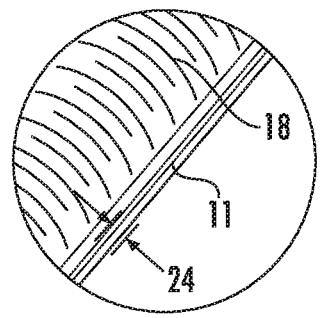
Figure 1D:
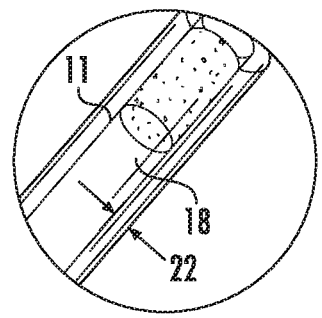

The present disclosure relates to unitary measuring pipettes (e.g., serological pipettes), and methods and apparatuses for forming unitary measuring pipettes by vacuum forming.

Vacuum forming of pipettes with thermoplastic material results in a body structure of biaxially oriented polymer, thereby enabling wall thickness of a pipette body to be reduced. At the same time, reduction, elimination, and/or reorientation of raised circumferential witness features using fabrication apparatuses and methods disclosed herein may reduce or eliminate interference between such witness features and graduated volumetric markings printed on an outside surface of the pipette body. Exemplary apparatuses and methods for reducing or eliminating raised circumferential witness features may utilize molding surfaces with gas permeable apertures or pores having a maximum width or diameter of no greater than 150 microns, or in a range of from 10 microns to 100 microns, with such surfaces definable in (i) face plates or inserts configured to cooperate with mold blanks, or (ii) cooperating first and second mold bodies, optionally each composed of multiple mold body sections. Gas permeable pores may be provided in porous materials (e.g., porous sintered metals), and gas permeable apertures may be provided in nonporous materials configured as arrays of holes, as transverse slots, as longitudinal slots, and/or openings of any other desired conformations. When gas permeable apertures (as opposed to pores) are defined in a face plate, insert, or mold body section, chamfering or radiusing corners bounding such apertures may also serve to reduce the height of any raised witness features subject to being formed in such apertures during a vacuum forming operation. Such chamfering or radiusing of corners may be performed in addition to, or as an alternative to, reducing dimensions of the gas permeable apertures in order to reduce or eliminate circumferential witness features.

A brief introduction to polymer orientation principles follows, to enable understanding of biaxial orientation.

The ability of a polymer to sustain a mechanical load depends on the strength of covalent bonds and the forces between the molecules. In an amorphous system, much of a mechanical load is carried by van der Waals interactions and random coil entanglements between chains. If, however, a substantial fraction of the polymer chains can be aligned (i.e., oriented) in the load-bearing direction, then a larger portion of the load can be transmitted to the main-chain covalent bonds. In amorphous systems only chain orientation occurs, whereas both chains and crystalline regions can be aligned in semicrystalline polymers. In both amorphous and semicrystalline systems the result of orientation it leads to an increased strength in the direction of orientation. Uniaxially oriented materials are typically exhibit low strength in a perpendicular to the orientation.

Polymer chains are oriented by subjecting them to extensional strain (flow) in a melted or near-melted state. Biaxial orientation of a polymer material can be achieved by straining the material in two directions (e.g., a radial direction and a lengthwise direction) at elevated temperature, and allowing the material to cool while strained. As compared to unoriented or uniaxially oriented polymers, biaxial orientation allows the production of reduced thickness films and containers having enhanced mechanical and optical properties. Biaxial orientation may be obtained from blow-molding or vacuum molding operations.

Before turning to specific details for reducing, eliminating, and/or reorienting raised circumferential witness features of pipettes, a general introduction to apparatuses and method steps for vacuum forming of unitary measuring pipettes is provided below, with reference to FIGS. 4A to 6.

Figure 4A:
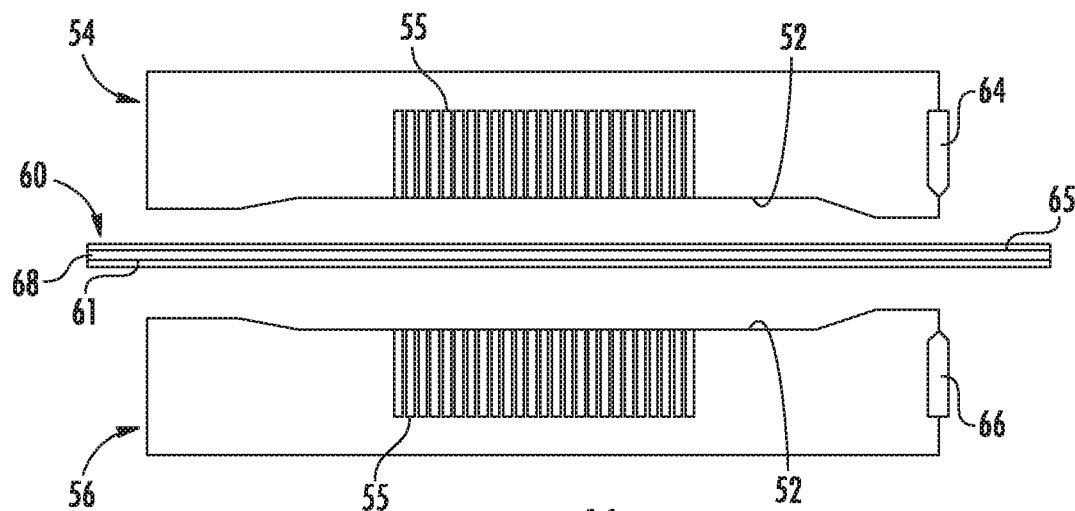
FIGS. 4A-4C are schematic cross-sectional view illustrations of steps of a method for vacuum forming a unitary measuring pipette.
Figure 4B:
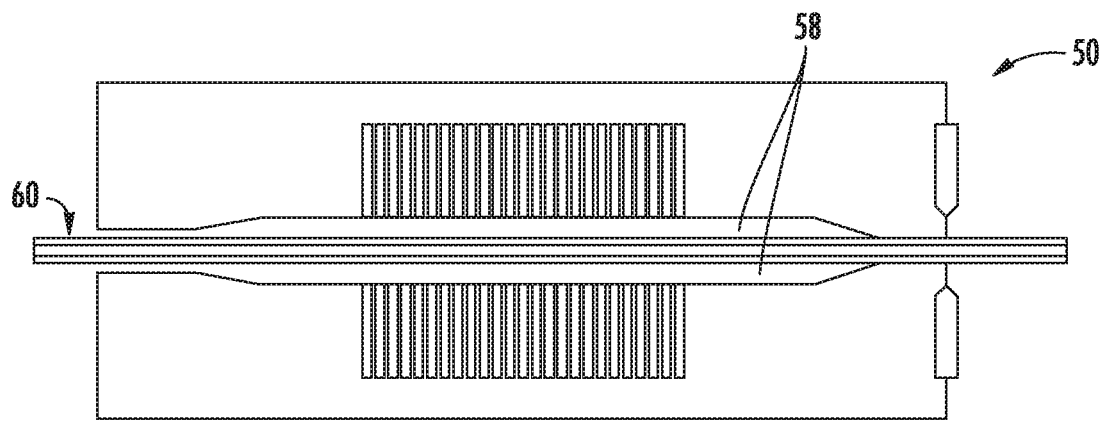
Figure 4C:
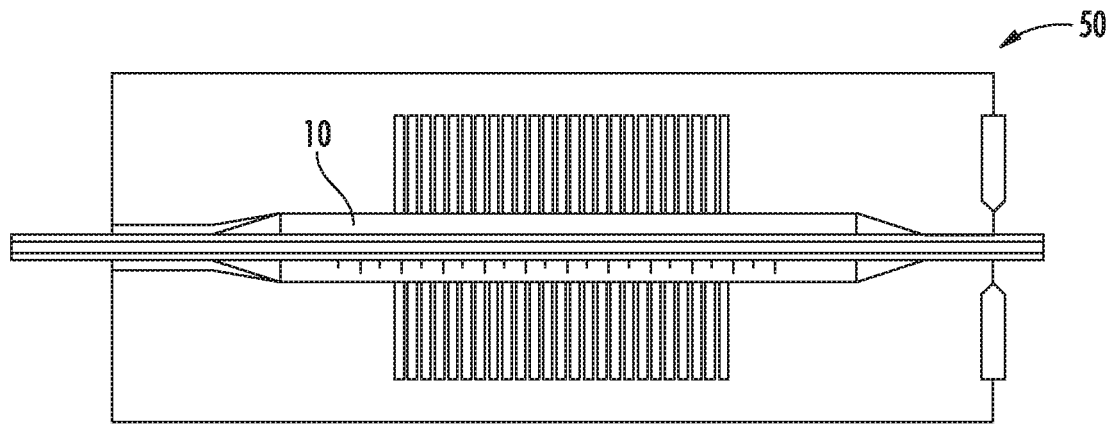

FIGS. 4A-4C are schematic cross-sectional view illustrations of steps of a method for vacuum forming a unitary measuring pipette. A parison 60 (or a tube or preform) may be inserted into a mold 50, which is composed of mold halves 54, 56 defining a mold cavity 58 bounded by molding surfaces 52. The mold 50 may include mold end features 64, 66, which may include blades, knives, or sharp edges used to cut or score a parison 60 or pipette 10 (as shown in FIG. 1A) formed in the mold 50. Typically, the parison 60 is in the shape of a hollow cylinder; however, the parison 60 could optionally be provided as a hollow hexagonally-walled prism, or another shape. The parison 60 may comprise an inner curved surface 61 that encloses an interior space 68. The parison 60 may have a parison thickness 65. The parison 60 may be manufactured from any suitable material (including polymers such as polystyrene and polypropylene, or glass), for example, by extruding a polymer melt to form a hollow cylindrical tube. The parison 60 may be heated to within a softening temperature at which the material of the parison 60 is readily formable, followed by either (i) insertion of the parison 60 into the mold cavity 58, or (ii) closure of the mold halves 54, 56 around the parison 60. Then a subatmospheric (e.g., vacuum) pressure condition is created within the mold 50 by vacuum passages 55. The subatmospheric pressure may be in a range, for example, of about 0.01 MPa to about 0.09 MPa. The reduced pressure in the mold cavity 58 causes the parison 60 to expand outward to contact the mold 50 (which is at a lower temperature) and conform to the shape of the mold cavity 58 to form a pipette 10. Expansion of the heated material of the parison 60 into the vacuum passages 55 may also cause the pipette 10 to form circumferential witness features 28 (as shown in FIG. 3) along an exterior surface thereof.

Fabricating a pipette 10 (as shown in FIG. 1A) by vacuum forming may enhance the toughness of the pipette 10 due to biaxial expansion during the vacuum forming process. During vacuum forming, surface features such as volumetric markings 17 (as shown in FIG. 1A) may be added to an outer surface of the pipette 10. These volumetric markings 17 may be created by several different techniques, either alone or in combination with each other. These techniques may include: printing or imprinting the mold cavity 58 to create mold surface features that correspond to pipette surface features during molding; depositing ink on the surface of the mold cavity 58 that is then transferred to an outer surface of the pipette 10 during molding; or inserting a label into the mold cavity 58 that attaches to an outer surface of the pipette 10 during molding. Once the pipette 10 has cooled sufficiently, the mold 50 may be opened, for example by opening the mold halves 54, 56, and the pipette 10 may be ejected. Optionally, one or both mold halves 54, 56 may be pivoted to accomplish opening of the mold 50. A new parison may then be inserted into the mold 50, and the process may be repeated to form another pipette.

Figure 5:
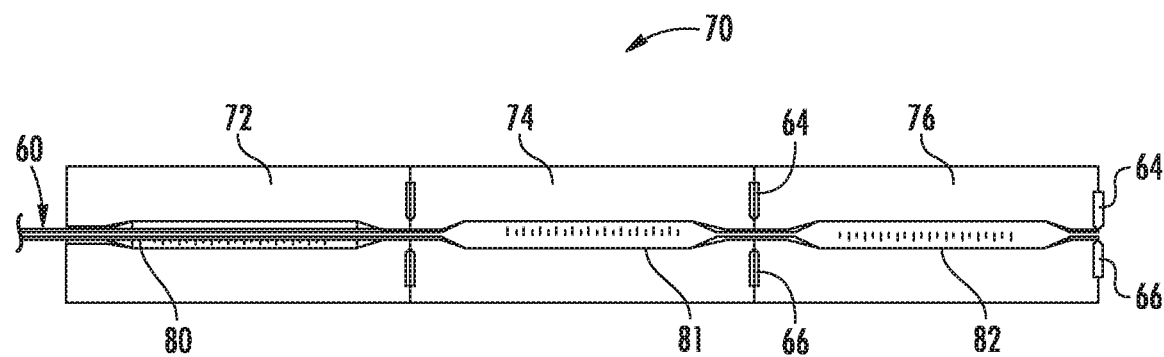
FIG. 5 is a schematic cross-sectional view illustration of an apparatus for molding three unitary measuring pipettes, with separation features between pipette cavities.

In certain implementations, a mold may be used to fabricate multiple pipettes simultaneously. FIG. 5 illustrates a mold 70 comprising three mold sections 72, 74, 76 in which three pipettes 80-82 have been formed. The pipettes 80-82 may be vacuum formed and separated in accordance with separation features as described in further detail below.

As one example, the pipettes 80-82 may be cut by separation features 64, 66, which may be blades, knives, or sharp edges used to cut or score a parison 60 or pipette 80-82. Optionally, pipettes 80, 81 may be arranged such that their tip regions are adjacent to each other, and pipettes 81, 82 may be arranged such that their mouth regions are adjacent to each other. Arranging the pipettes tip-to-tip and mouth-to-mouth may enhance production efficiency and reduce production costs. For example, the amount of scrap pipette material generated may be reduced by arranging adjacent pipettes tip-to-tip and mouth-to-mouth. As an alternative, pipettes may be arranged such that the mouth region of a first of pipettes 80, 81 is adjacent to the tip region of the other of pipettes 81, 82. The large step change from the mouth thickness to the tip thickness provides a position in the mold 70 where force on the pipettes 81, 82 facilitates separation, and may lead to enhanced separation efficiency. Although not shown in FIG. 5, it is to be appreciated that vacuum passages may be defined through the mold sections 72, 74, 76 to enable vacuum forming to be performed.

Figure 6:
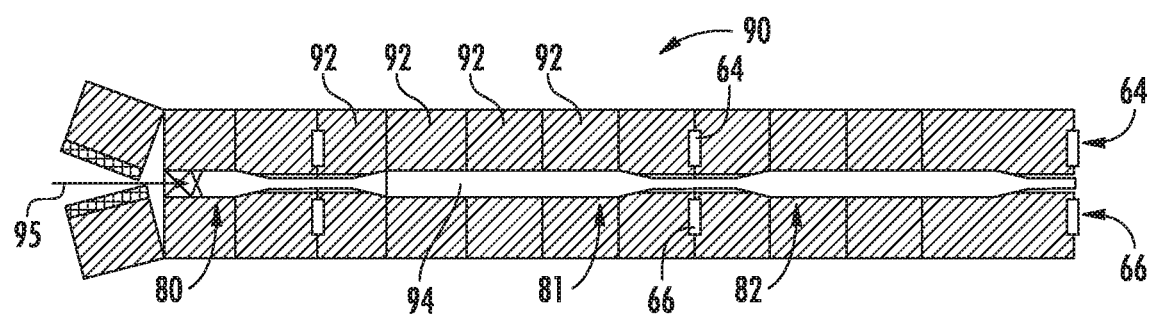
FIG. 6 is a schematic cross-sectional view illustration of an apparatus for molding three unitary measuring pipettes including a plurality of successively separable mold assembly segments.

In certain implementations, a mold assembly may include multiple mold assembly segments that may be sequentially arranged to form one or more pipettes. Optionally, each mold assembly segment may be shorter than a full length of an individual pipette. FIG. 6 illustrates a mold assembly 90 comprising a plurality of mold assembly segments 92 that may be selectively opened and closed as desired during pipette fabrication. As an alternative to preforming a parison and inserting the parison into the mold, a polymer melt may be extruded from extruder output 95 to form a parison or preform while contacting the parison or preform with the mold assembly segments 92 in succession. The mold assembly 90 is shaped to form the pipettes 80-82, which conform to internal cavities 94 of the mold assembly segments 92. In certain implementations, individual mold assembly segments 92 may have lengths ranging from about 0.25 inch to about 14 inches, or from about 0.50 inch to about 10 inches, or from about 1.0 inch to about 7.0 inches, or from about 2.0 inches to about 4.0 inches. Compressed air may be applied intermittently or continuously into the mold assembly 90 to form pipettes 80-82 in the shape of the mold assembly 90. Subatmospheric pressure may be intermittently or continuously introduced in the mold assembly 90 (outside the pipettes 80-82) via gas passages (not shown) defined in the mold assembly segments 92 and in fluid communication with molding surfaces bounding the cavities 94 of the mold assembly segments 92. When subatmospheric pressure conditions are continuously maintained, the mouth, body, and tip portions of the pipettes 80-82 may be formed by varying a speed in which the mold assembly segments 92 are contacted with the pipettes 80-82 and/or by varying an output speed of the extruder output 95. The pipettes 80-82 may be drawn and cut by separation features 64, 66, which may include blades, knives, or sharp edges used to cut or score the pipettes 80-82.

In certain embodiments, an apparatus for vacuum forming at least a hollow tubular portion of a pipette (optionally, an entirety of a unitary measuring pipette including tip and mouthpiece portions thereof) includes first and second mold blanks defining vacuum channels therein, with first and second face plates or inserts received in recesses defined by the mold blanks. The first and second face plates or inserts define complementary semi-cylindrical molding surfaces each defining a plurality of gas-permeable apertures or pores therein, with the gas-permeable apertures or pores each having a maximum width or diameter of no greater than 150 microns (or in a range of from 10 microns to 100 microns, or a subrange thereof), and being in fluid communication with vacuum channels defined in the face plates. In combination, two semi-cylindrical molding surfaces may define a cylindrical molding cavity suitable for forming at least a portion of a pipette. In certain embodiments, a face plate or insert may comprise a porous material (e.g., sintered porous material, such as sintered porous metal or ceramic) defining a plurality of gas-permeable pores.

The terms "face plate" and "insert" may be used alternatively or interchangeably through this document to refer to elements that are arranged to be received by mold blanks, and that define molding surfaces intended to contact heated thermoplastic material during a molding operation. In certain embodiments, a "face plate" may refer to a plate-like element typically having a length and/or width that is substantially greater than its thickness, optionally including a substantially constant thickness (regardless of whether portions of the face plate may be curved or bent, such as to define a semi-cylindrical molding surface). In certain embodiments, an "insert" may have a non-constant thickness (e.g., in portions adjacent to a semi-cylindrical molding surface), but may have maximum thickness dimensions of similar magnitude to one or both of the length and width dimensions.

In certain embodiments, a face plate or insert may comprise a non-porous material such as a ceramic or a metal (e.g., aluminum, stainless steel, etc., optionally with one or more surface layers such as an anodized layer and/or a coating of non-stick material such as polytetrafluoroethylene to facilitate release of molded parts), and may define multiple gas-permeable apertures defining through an entire thickness of the face plate or insert. For example, gas-permeable apertures may be configured as arrays of holes, as transverse slots, as longitudinal slots, and/or openings of any other desired conformations. Longitudinal slots may be oriented substantially parallel to, and transverse slots may be oriented substantially perpendicular to, a longitudinal axis definable along a center of an imaginary cylinder bounded by semi-cylindrical molding surfaces of first and second face plates or inserts. In certain embodiments, one or more apertures may comprise an elongated slot (whether straight or including multiple interconnected angled or curved segments) that includes a maximum width of no greater than 150 microns (or in a range of from 10 microns to 100 microns), and comprises a maximum length of at least ten times the maximum width.

A face plate or insert as disclosed herein may be fabricated using various techniques. One or more additive manufacturing methods (e.g., 3D printing) and/or subtractive manufacturing methods (e.g., rotary machining, electron discharge machining (EDM), laser cutting, waterjet cutting, photolithographic patterning followed by etching, and/or surface grinding may be used) may be used to fabricate portions or an entirety of a face plate or insert. In certain embodiments, face plate or insert may be produced by forming an initial body structure of a gas impermeable material (e.g., non-porous metal) by techniques such as casting, forging, or machining, and then selectively removing portions of the initial body structure by one or more of the above-described subtractive manufacturing methods to form one or more apertures that includes a maximum width of no greater than 150 microns (or in a range of from 10 microns to 100 microns, or in a range of 10 microns to 50 microns). Gas permeable apertures defined in face plates or inserts of nonporous materials may be configured as arrays of holes, as transverse slots, as longitudinal slots, and/or openings of any other desired conformations. In certain embodiments, gas permeable pores may be defined in face plates or inserts fabricated of porous materials (e.g., porous sintered metal and/or ceramic materials).

Figure 7:
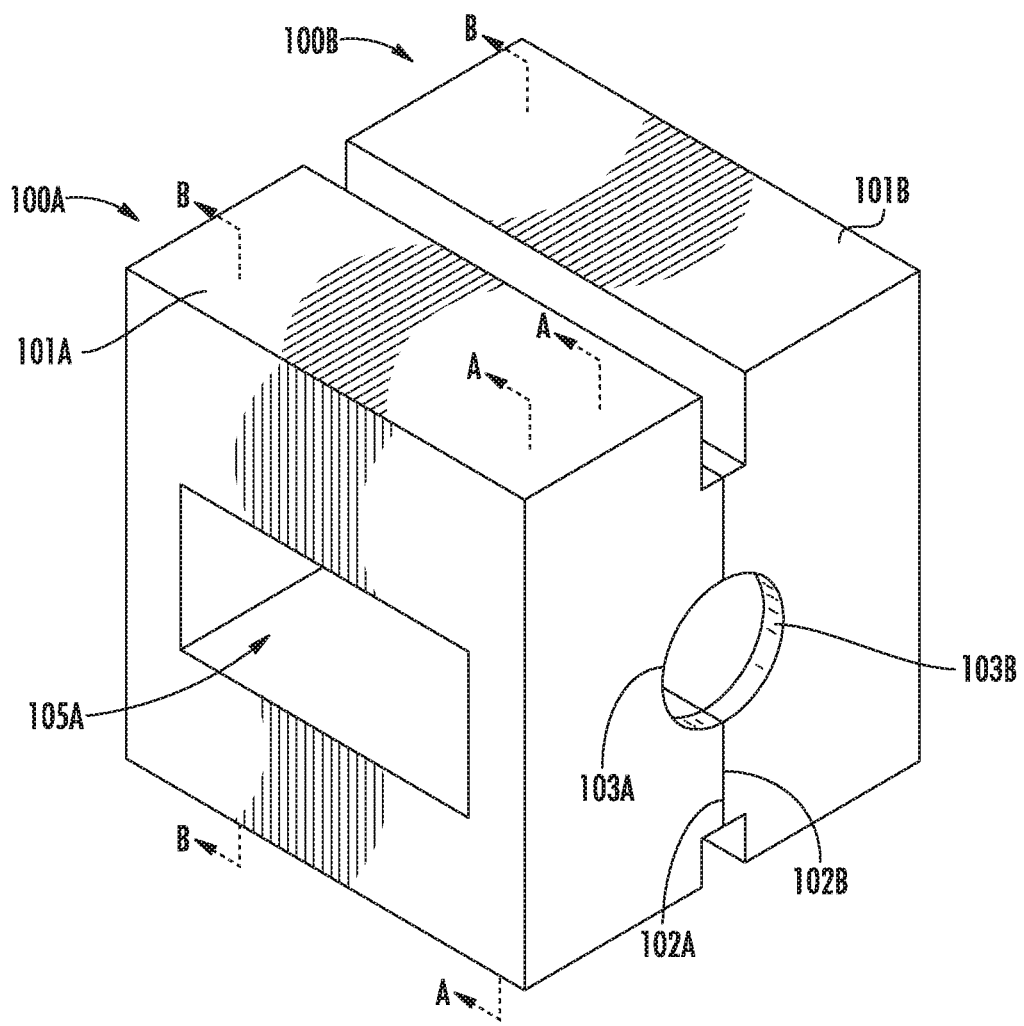
FIG. 7 is a perspective view illustration of first and second mold blanks each defining a single wide vacuum channel and being mated to one another, with each mold blank being configured for receiving a face plate or insert defining gas permeable apertures or pores and suitable for molding at least a portion of a unitary measuring pipette.

FIG. 7 illustrates first and second mold blanks 100A, 100B each defining a single wide vacuum channel 105A, 105B (shown in FIG. 9) and being mated to one another, with each mold blank 105A, 105B being configured for receiving a face plate or insert (e.g., with gas permeable apertures or pores) suitable for vacuum forming at least a portion of a unitary measuring pipette. Each mold blank 100A, 100B includes a body structure 101A, 101B and defines a mating surface 102A, 102B for mating with a mating surface 102A, 102B of the other mold blank 100A, 100B. Each mold blank 100A, 100B further includes a semicircular aperture 103A, 103B extending in a direction orthogonal to each vacuum channel 105A, 105B, with the semicircular apertures 103A, 103B in combination forming a circular aperture suitable for receiving a parison (not shown) in preparation for a vacuum forming operation. In certain embodiments, the mold blanks 100A, 100B may be fabricated of suitably thermally conductive and heat resistant materials, such as (but not limited to) metals or ceramics, by fabrication techniques such as casting, machining, additive manufacturing (e.g., 3D printing), or the like. In certain embodiments, the mold blanks 100A, 100B and associated face plates or inserts (not shown) may embody separable mold assembly segments useable as part of an apparatus for molding unitary measuring pipettes, similar to the apparatus 90 illustrated and described in connection with of FIG. 6.

Figure 8:
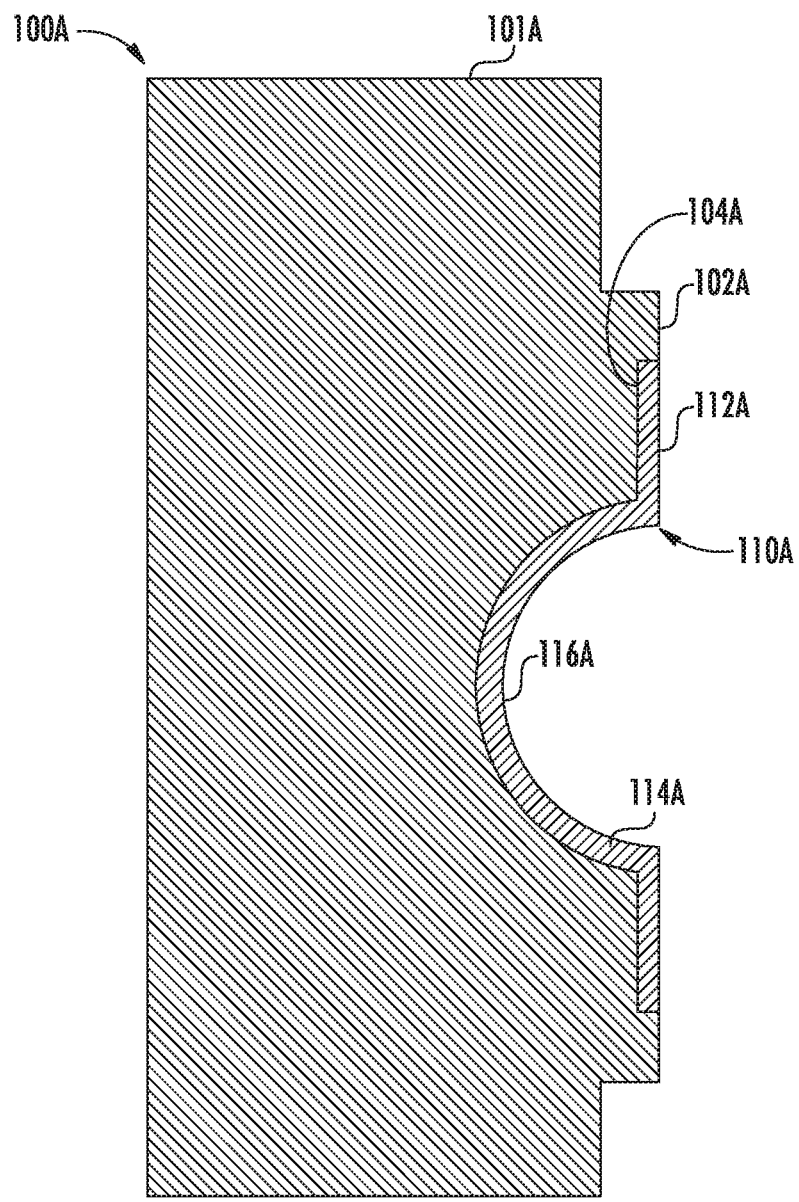
FIG. 8 is a side cross-sectional view illustration of a first mold blank according to FIG. 7, taken along section lines "A-A" in FIG. 7, with a face plate or insert received therein.

FIG. 8 is a side cross-sectional view illustration of the first mold blank 100A according to FIG. 7, taken along section lines "A-A" in FIG. 7, with a face plate or insert 110A received in a cavity 104A defined in a body structure 101A of mold blank 100A. The face plate or insert 110A includes a curved section 114A (which defines a curved molding surface 116A) arranged between straight sections 112A, with the curved section 114A and the straight sections 112A having substantially the same thickness. As shown, the straight sections 112A may be substantially coplanar with the mating surface 102A of the first mold blank 100A.

Figure 9:
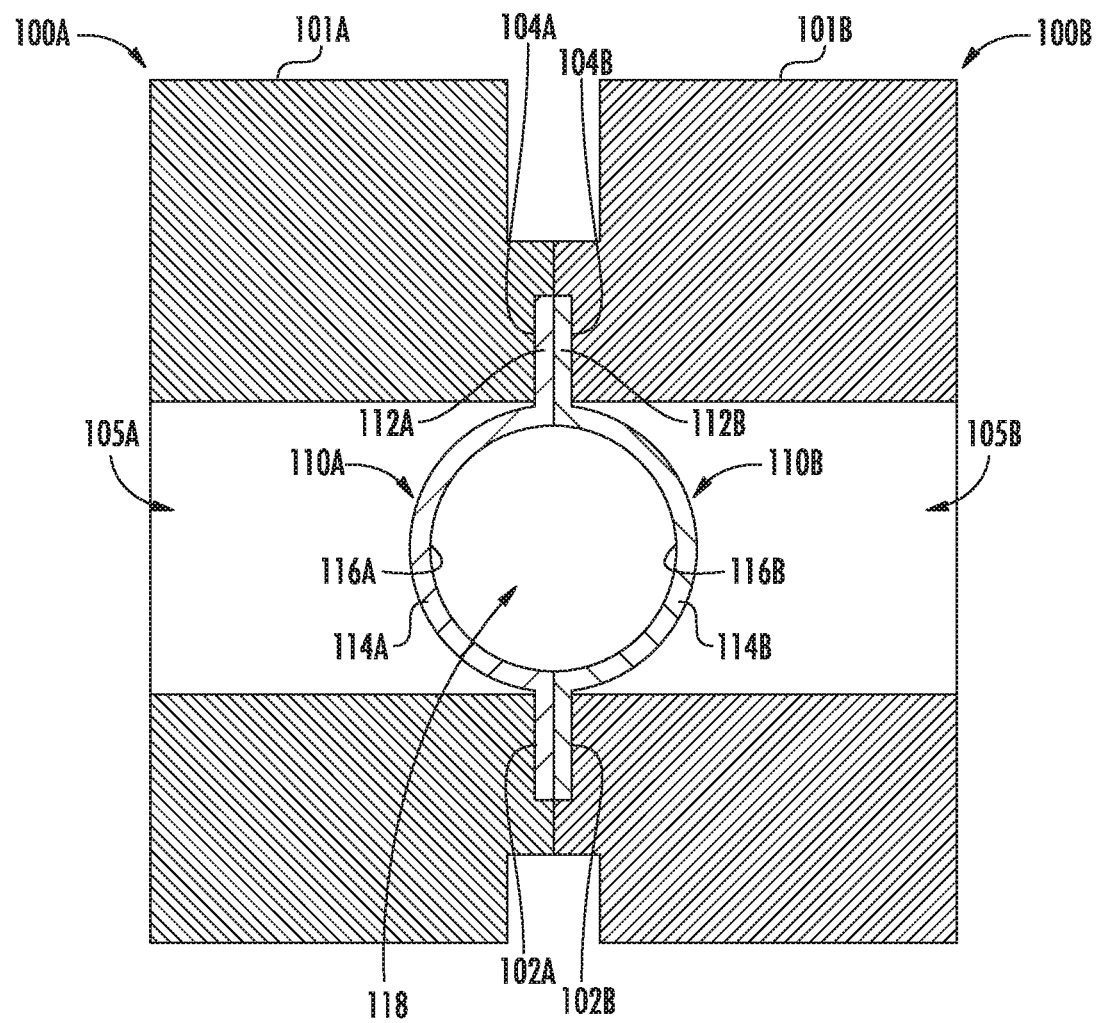
FIG. 9 is a side cross-sectional view illustration of the first and second mold blanks of FIG. 7, taken along section line "B-B" in FIG. 7, with the mold blanks receiving therein first and second face plates or inserts.

FIG. 9 is a side cross-sectional view illustration of the first and second mold blanks 100A, 100B of FIG. 7, taken along section line "B-B" in FIG. 7, with first and second face plates or inserts 110A, 110B being received within cavities 104A, 104B of the mold blanks 100A, 100B. Each mold blank 100A, 100B includes a body structure 101A, 101B. The first and second mold blanks 101A, 101B are arranged in contact with one another along the mating surfaces 102A, 102B, with the straight sections 112A, 112B of the face plates or inserts 110A, 110B also arranged in contact with one another. Each face plate or insert 110A, 110B includes a curved section 114A, 114B arranged between two straight sections 112A, 112B. The curved sections 114A, 114B of the face plates or inserts 110A, 110B are arranged within vacuum channels 105A, 105B defined in the mold blanks 100A, 100B, with the curved molding surfaces 116A, 116B of the curved sections 114A, 114B in combination forming a generally cylindrical cavity 118 for fabricating at least a portion of a pipette.

Figure 10:
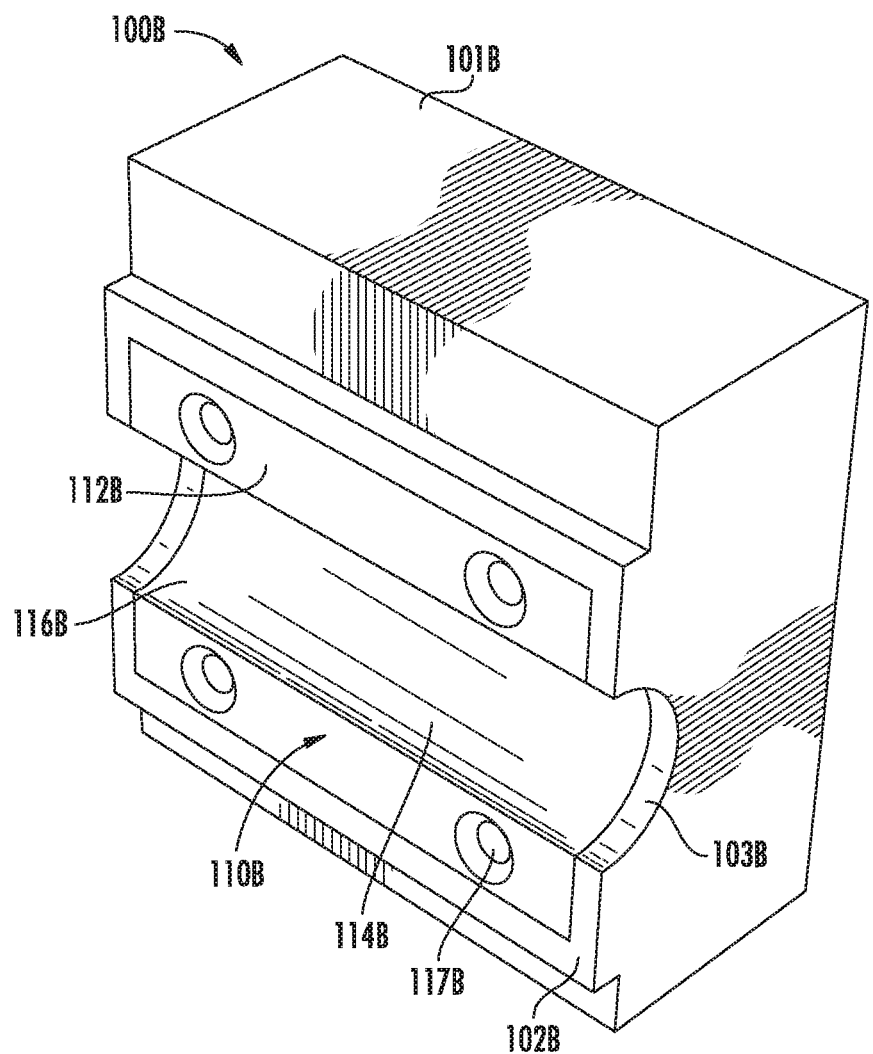
FIG. 10 is a perspective view illustration of a mold blank and face plate or insert according to FIGS. 8 and 9.

FIG. 10 is a perspective view illustration of second mold blank 100B of FIG. 9 and with the face plate or insert 110B of FIG. 9 received in a cavity defined in a body structure 101B of the mold blank 100B. The face plate or insert 110B includes a curved section 114B arranged between two straight sections 112B, with the curved section 114B forming a curved molding surface 116B. The face plate or insert 110B further includes countersunk holes 117B configured to receive screws (not shown) for cooperating with tapped holes (not shown) defined in the second mold blank 100B for removably affixing the face plate or insert 110B to the second mold blank 100B. As shown, the straight sections 112B may form a continuous surface with the mating surface 102B of the second mold blank 100B. Additionally, the semicircular aperture 103B defined in the second mold blank 100B is registered with the curved molding surface 116B of the face plate or insert 110B. Although the face plate or insert 110B is not illustrated as including any gas permeable apertures or pores, it is to be appreciated that an operative face plate or insert would desirably include gas permeable apertures or pores to permit vacuum forming of at least a portion of a pipette. Accordingly, various face plates or inserts described hereinafter include gas permeable apertures or pores of various sizes, shapes, and orientations.

FIGS. 11A and 11B illustrate a face plate or insert 120 including gas permeable apertures 125 embodied in multiple narrow, transversely extending slots 125. Although six transversely extending slots 125 are illustrated, it is to be appreciated that any suitable number of transversely extending slots 125 may be provided. Each transversely extending slot 125 preferably has a maximum width of no greater than 150 microns (or in a range of from 10 to 100 microns, or in a subrange of from 10 to 50 microns), and comprises a maximum length of at least ten times the maximum width. The face plate includes a curved section 124 arranged between two straight sections 122, with the curved section 124 forming a curved molding surface 126. Each transversely extending slot 125 extends through an entire thickness of the face plate or insert 120, and spans the entire distance of the curved section 124, while extending a short distance into each straight section 122. In certain embodiments, the transversely extending slots 125 may be defined by techniques such as EDM, laser cutting, waterjet cutting, or photolithographic patterning and etching. The face plate or insert 120 further includes countersunk holes 127 configured to receive screws (not shown) for cooperating with tapped holes defined in a mold blank (e.g., mold blank 100B shown in FIG. 10). As shown in FIG. 11B, the curved section 124 and the straight sections 122 have substantially the same thickness.

FIGS. 12A and 12B illustrate a face plate or insert 130 including gas permeable apertures 135 embodied in multiple narrow, longitudinally extending slots 135. Each longitudinally extending slot 135 preferably has a maximum width of no greater than 150 microns (or in a range of from 10 to 100 microns, or in a subrange of from 10 to 50 microns), and comprises a maximum length of at least ten times the maximum width. The face plate includes a curved section 134 arranged between two straight sections 132, with the curved section 134 forming a curved molding surface 136. Each longitudinally extending slot 135 extends through an entire thickness of the face plate or insert 130, and at least about 90% of a length of curved section 134, while extending a short distance into each straight section 132. The longitudinally extending slots 135 may be defined by the same techniques described previously herein. The face plate or insert 130 further includes countersunk holes 137 configured to receive screws (not shown) for attaching the face plate or insert 130 to a mold blank (e.g., mold blank 100B shown in FIG. 10). As shown in FIG. 12B, the curved section 134 and the straight sections 132 have substantially the same thickness.

Figure 12C:
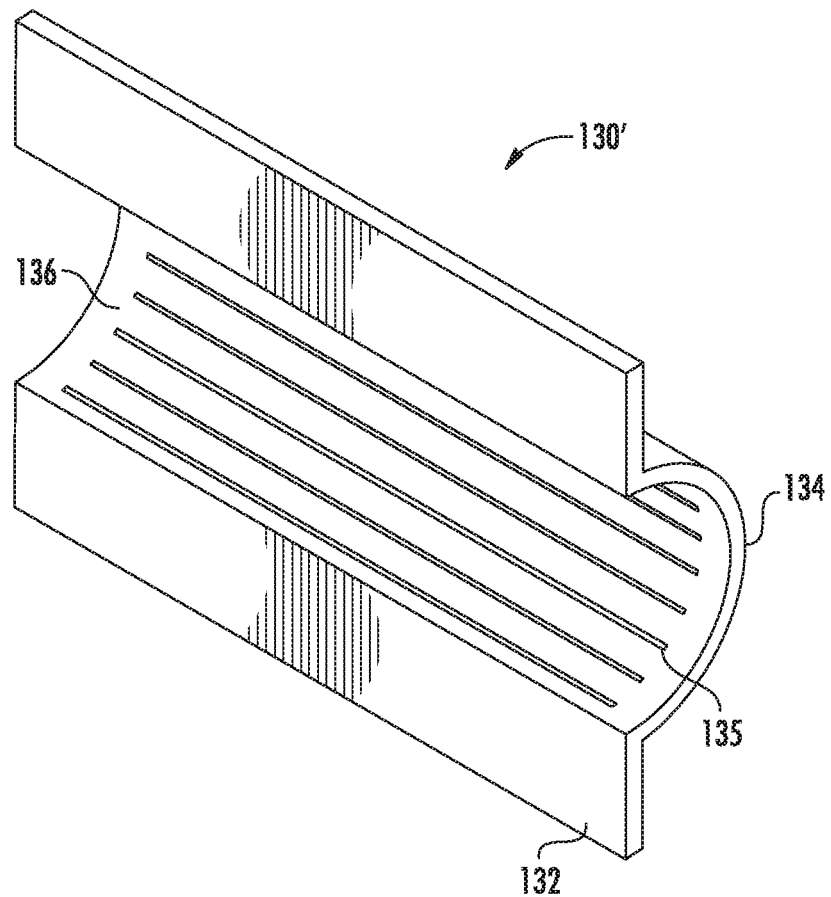
FIG. 12C is a perspective view illustration of a face plate or insert substantially similar to face plate or insert shown in FIGS. 12A and 12B, but lacking mounting holes.

FIG. 12C is a perspective view illustration of a face plate or insert 130' substantially similar to face plate or insert 130 shown in FIGS. 12A and 12B, but lacking holes to permit mounting of the face plate or insert 130 to a mold blank. The face plate or insert 130' includes a curved section 134 arranged between two straight sections 132, with the curved section 134 forming a curved molding surface 136. Multiple gas permeable apertures 135 embodied in multiple narrow, longitudinally extending slots 135 are defined through the curved section 134. In certain embodiments, the face plate or insert 130' may be attached to a mold blank (not shown) by welding, adhering, or press-fitting the straight sections 132 against corresponding surfaces of the mold blank.

Figure 13C:
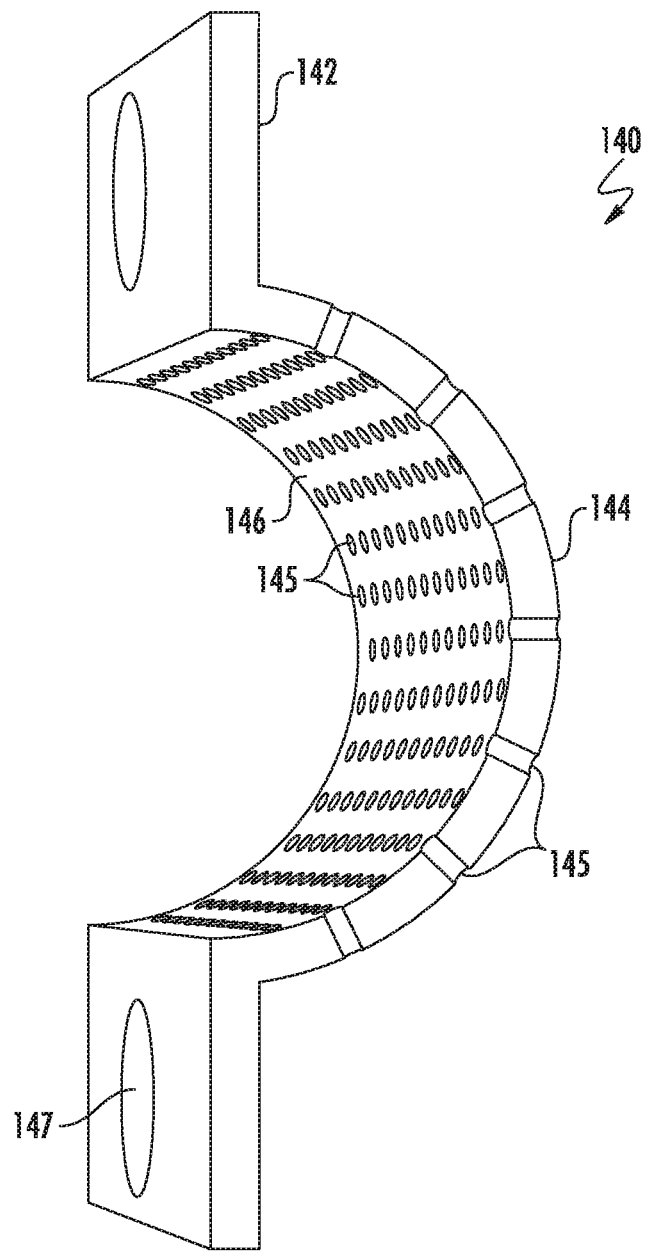
FIG. 13C is a perspective view illustration of the face plate or insert of FIG. 13A.

FIGS. 13A-13C illustrate a face plate or insert 140 including gas permeable apertures 145 embodied in an array of round holes 145 embodying offset rows of holes. Each hole 145 preferably has a maximum diameter or width of no greater than 150 microns (or in a range of from 10 to 100 microns, or in a subrange of from 10 to 50 microns), with the holes being formable by techniques such as EDM (e.g., EDM micro hole popping), laser cutting, waterjet cutting, or photolithographic patterning and etching. The face plate or insert 140 includes a curved section 144 arranged between two straight sections 142, with the curved section 144 forming a curved molding surface 146. Each hole 145 may be defined in a direction perpendicular to the curved molding surface 146, as shown in FIG. 13C. The face plate or insert 140 further includes countersunk holes 147 configured to receive screws (not shown) for cooperating with tapped holes defined in a mold blank (e.g., mold blank 100B shown in FIG. 10). As shown in FIGS. 13B and 13C, the curved section 144 and the straight sections 142 have substantially the same thickness.

FIGS. 14A and 14B illustrate a face plate or insert 150 including gas permeable apertures 155 embodied in an array of round holes 155 embodying aligned rows of holes. Each hole 155 may have similar dimensions and may be fabricated by the same techniques as mentioned in connection with FIGS. 13A-14C. The face plate or insert 150 includes a curved section 154 arranged between two straight sections 152, with the curved section 154 forming a curved molding surface 156. Each hole 155 may be defined in a direction perpendicular to the curved molding surface 156, as shown in FIG. 13C. The face plate or insert 150 further includes countersunk holes 157 configured to receive screws (not shown) for cooperating with tapped holes defined in a mold blank (e.g., mold blank 100B shown in FIG. 10). As shown in FIG. 14B, the curved section 154 and the straight sections 152 have substantially the same thickness.

FIGS. 15A-D and FIG. 15F illustrate a mold assembly 160 including first and second mold blanks 170A, 170B each defining multiple slot-like vacuum channels 175A, 175B (shown in FIG. 15F), with first and second face plates or inserts 140A, 140B (each according to the design of FIGS. 13A-13C) received within recesses 174A, 174B (shown in FIG. 15D) defined in the first and second mold blanks 170A, 170B. The mold assembly 160 is suitable for vacuum forming at least a portion of a pipette exhibiting improved surface quality (e.g., reduction or elimination of witness features that are non-parallel to the longitudinal axis and that protrude from an exterior surface of a tubular body of the pipette).

Figure 15A:
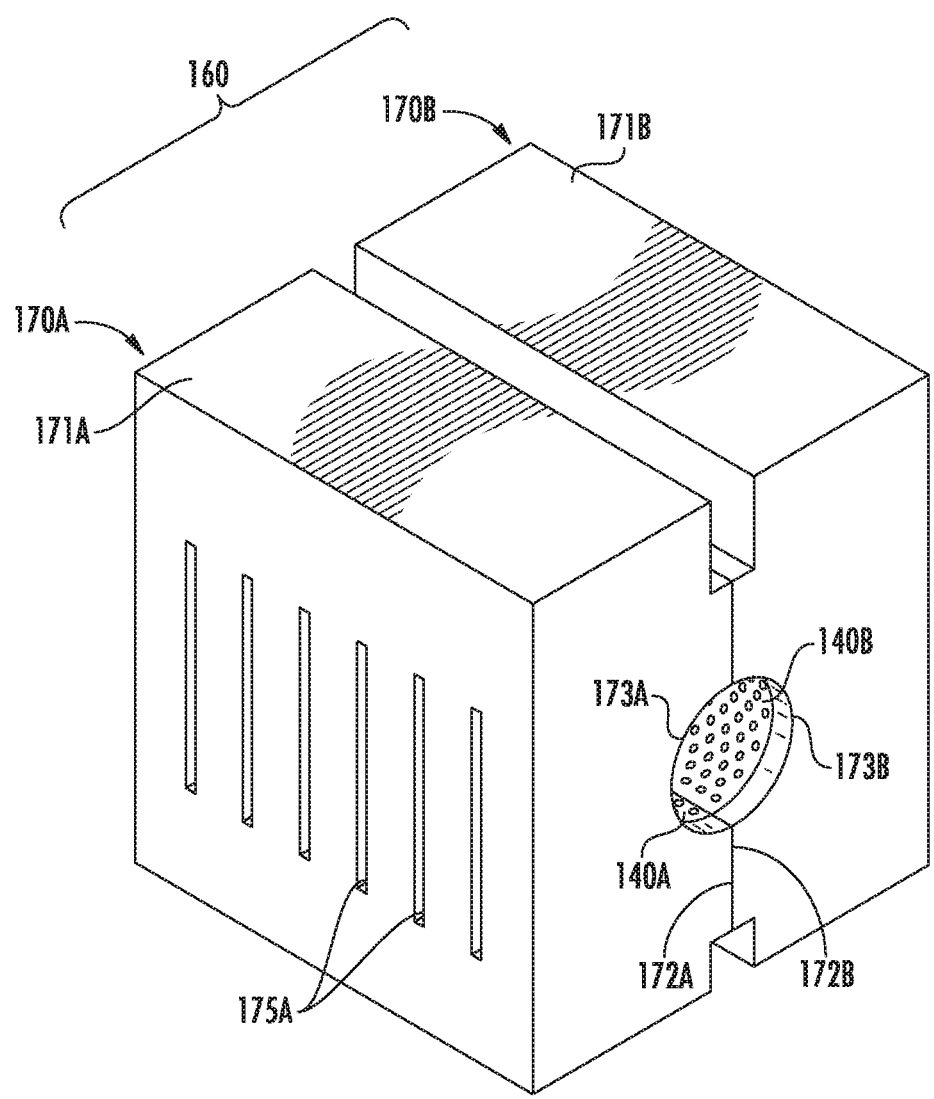
FIG. 15A is a perspective view illustration of a mold assembly including first and second mold blanks each defining multiple slot-like vacuum channels and being mated to one another, with first and second face plates or inserts each according to FIGS. 13A-13C received therein and being suitable for molding at least a portion of a unitary measuring pipette.

FIG. 15A is a perspective view illustration of the mold assembly 160. As shown, each mold blank 170A, 170B includes a body structure 171A, 171B and defines a mating surface 172A, 172B for mating with the other mold blank 170A, 170B. Each mold blank 170A, 170B further includes a semicircular aperture 173A, 173B extending in a direction orthogonal to each vacuum channel 175A, 175B (shown in FIG. 15F), with the semicircular apertures 173A, 173B in combination forming a circular aperture suitable for receiving a parison (not shown) in preparation for a vacuum forming operation.

Figure 15B:
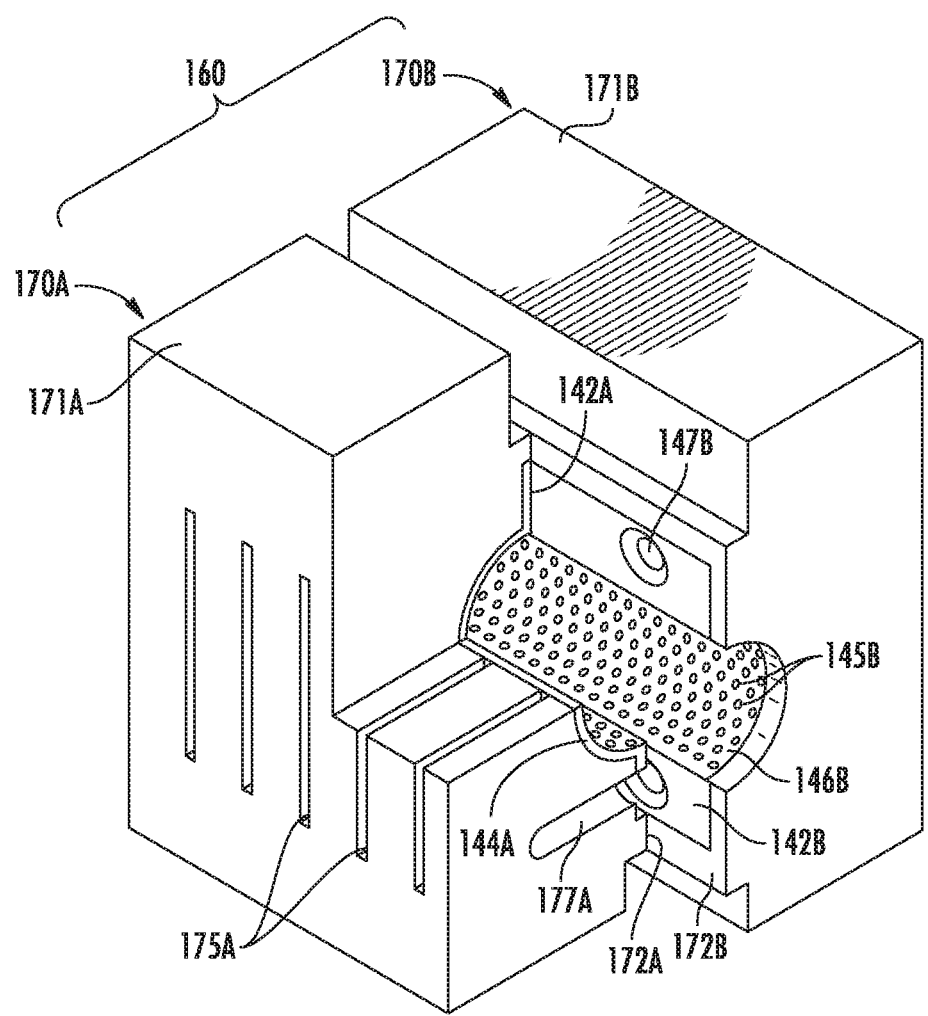
FIG. 15B is a perspective, partial cutaway view illustration of the mold assembly of FIG. 15A.
Figure 15C:
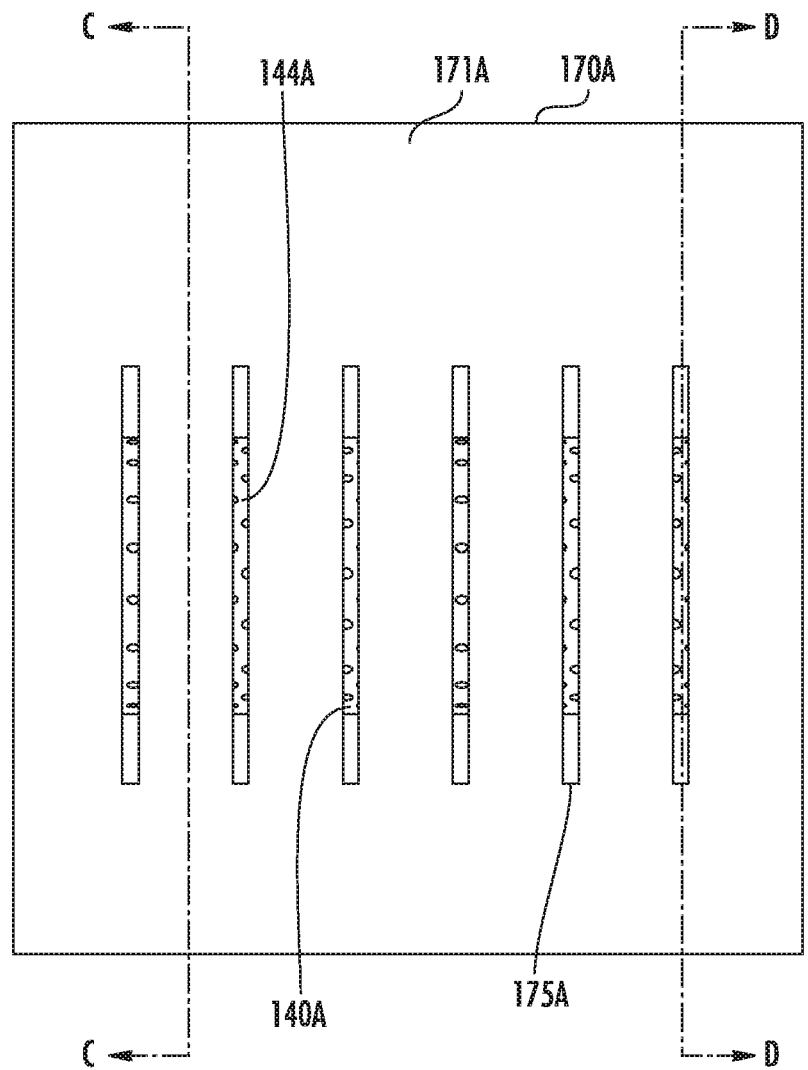
FIG. 15C is a front elevation view illustration of the mold assembly of FIGS. 15A and 15B.
Figure 15D:
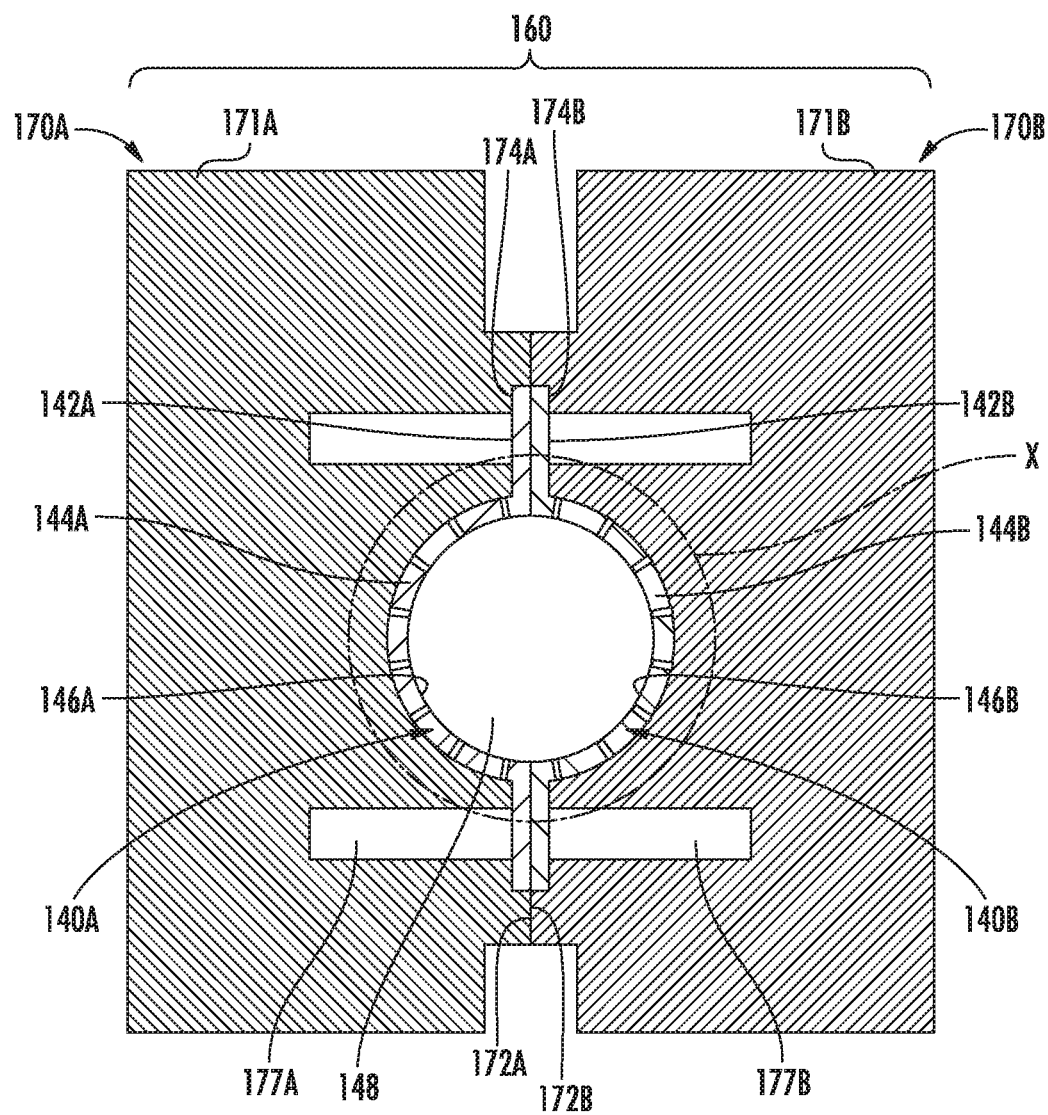
FIG. 15D is a cross-sectional view illustration of the mold assembly of FIGS. 15A-15C taken along section line "C-C" of FIG. 15C.
Figure 15E:
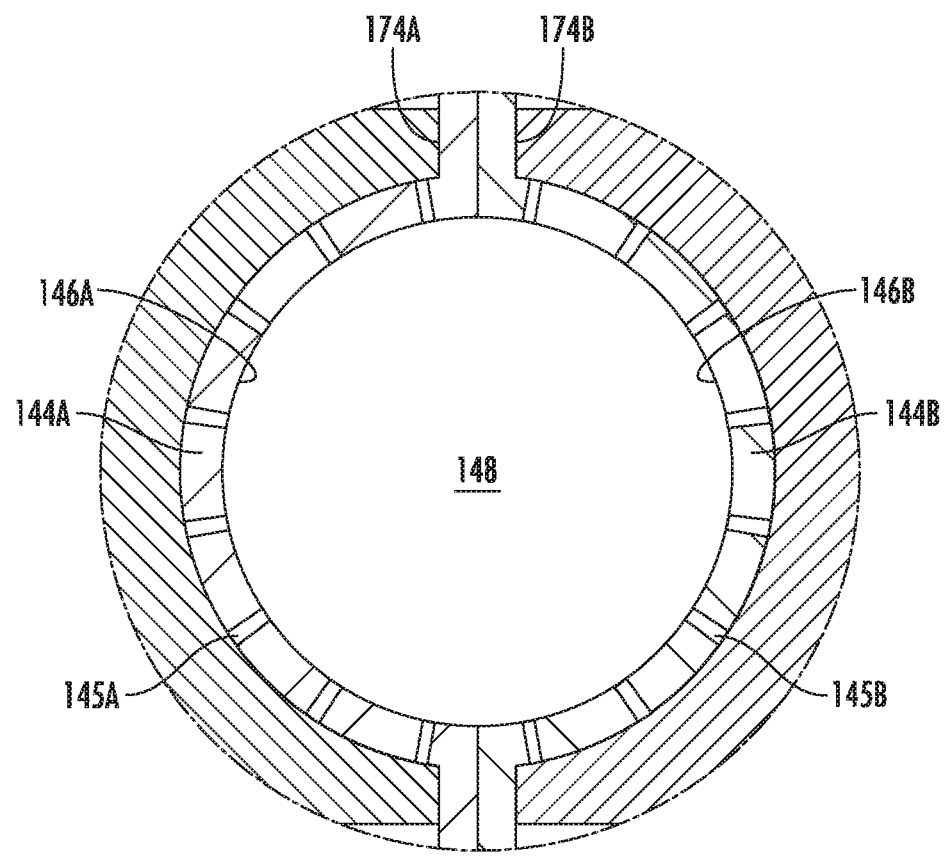
FIG. 15E is a magnified portion of the cross-sectional view illustration of FIG. 15D, indicated by dashed circle "X" of FIG. 14D.
Figure 15F:
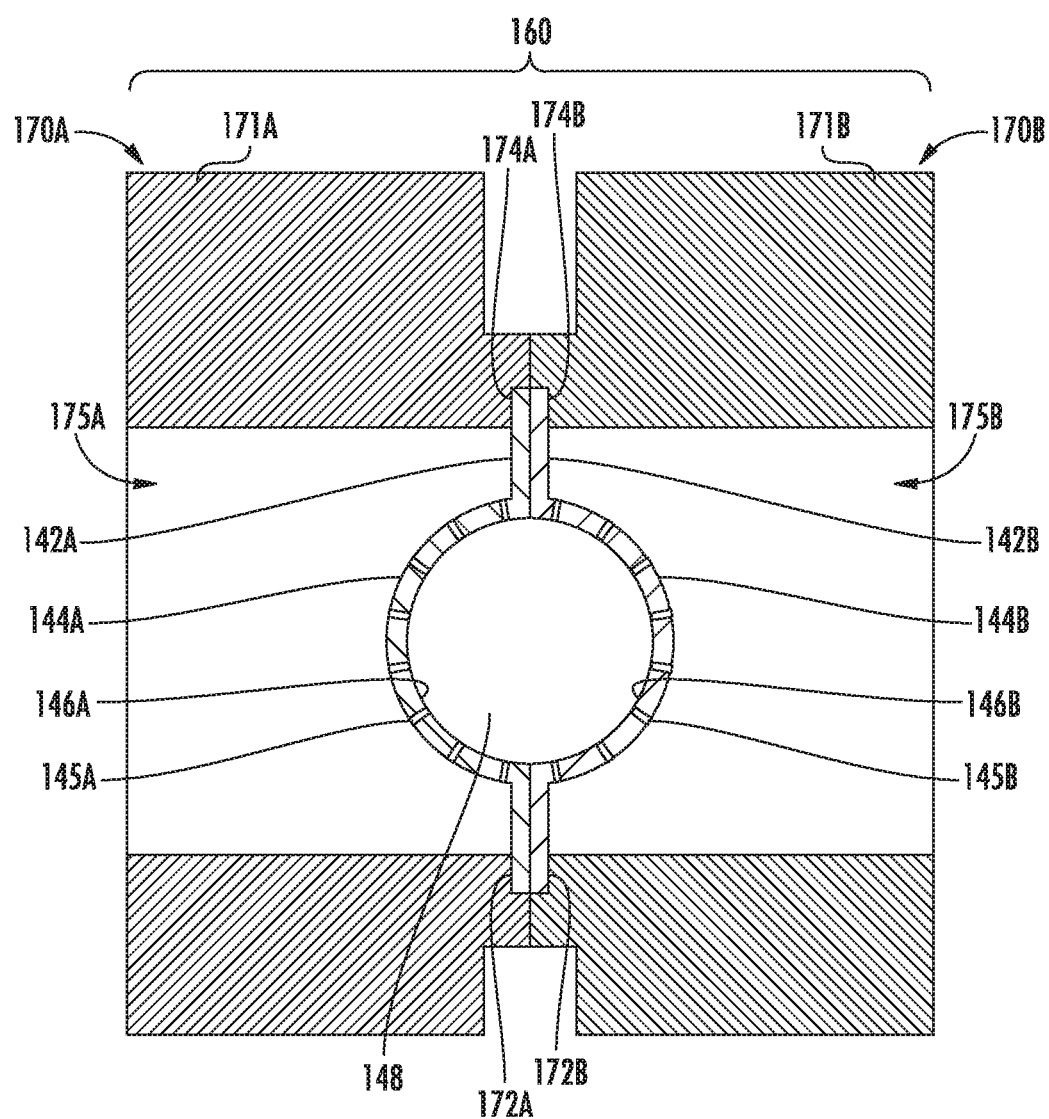
FIG. 15F is a cross-sectional view illustration of the mold assembly of FIGS. 15A-15C taken along section line "D-D" of FIG. 15C.

FIG. 15B is a perspective, partial cutaway view illustration of the mold assembly 160. FIG. 15C is a front elevation view illustration of the mold assembly 160. FIG. 15D is a cross-sectional view illustration of the mold assembly 160, taken along section line "C-C" of FIG. 15C, whereas FIG. 15E is a magnified portion of FIG. 15D. FIG. 15F is a cross-sectional view illustration of the mold assembly 160 taken along section line "D-D" of FIG. 15C. FIGS. 15B, 15D, and 15F show the face plates or inserts 140A, 140B received by mold blanks 170A, 170B, with each face plate or insert 140A, 140B (shown in FIG. 15D) including a curved section 144A, 144B arranged between two straight sections 142A, 142B, and with the respective straight sections 142A, 142B abutting one another. As shown in FIGS. 15B and 15D, the straight sections 142A, 142B of the face plates or inserts 140A, 140B define countersunk holes 147A, 147B (where only hole 147B is illustrated in FIG. 15B but it is to be appreciated that corresponding holes 147A are defined in straight sections 142A) configured to receive screws (not shown) for cooperating with tapped holes 177A, 177B in the mold blanks 171A, 171B. Referring to FIGS. 15D-15F, the curved sections 144A, 144B define curved molding surfaces 146A, 146B that in combination enclose a cavity 148. Holes 145A, 145B defined through the curved sections 144A, 144B are arranged in fluid communication with the vacuum channels 175A, 175B defined in the first and second mold blanks 170A, 170B, as shown in FIG. 15F. In this manner, a parison (not shown) may be vacuum formed within the cavity 148 when gaseous contents of the cavity 148 are evacuated through the holes 145A, 145B and the gas passages 175A, 175B by exposure of the gas passages 175A, 175B to subatmospheric conditions (e.g., using a vacuum pump, not shown). To ensure that holes 145A, 145 not registered with gas passages 175A, 175B may still be used to evacuate gaseous contents of the cavity 148, in certain embodiments, a slight gap sufficient to permit lateral passage of gas to the gas passages 175A, 175B may be provided at an interface between the curved sections 144A, 144B and the recesses 174A, 174B defined in the mold blanks 170A, 170B (with reference to FIGS. 15D and 15E).

Figure 16:
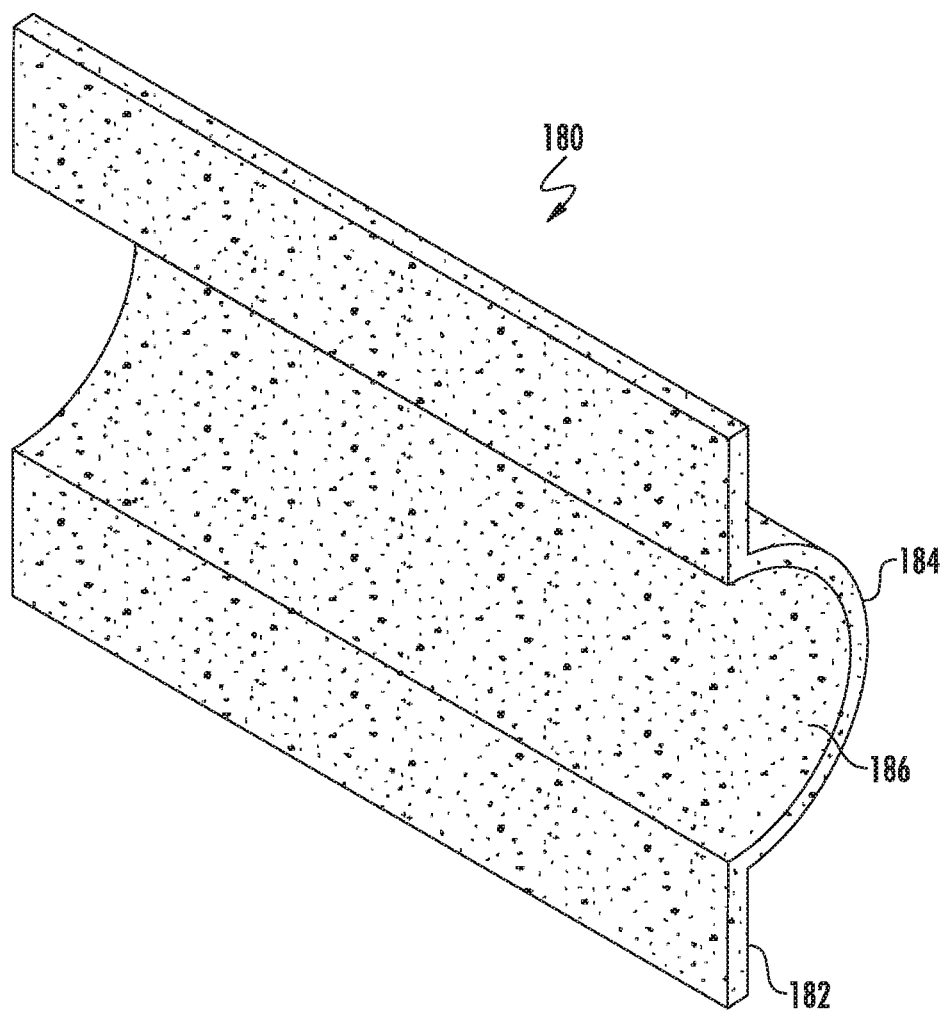
FIG. 16 is a perspective view illustration of a face plate or insert formed of a gas permeable material and defining a plurality of gas-permeable pores.

FIG. 16 is a perspective view illustration of a face plate or insert 180 formed of a gas permeable material and defining a plurality of gas-permeable pores. The face plate or insert 180 includes a curved section 184 (which defines a curved molding surface 186) arranged between straight sections 182, with the curved section 184 and the straight sections 182 having substantially the same thickness. In certain embodiments, the face plate or insert 180 may be attached to a mold blank (not shown) by welding, adhering, or press-fitting the straight sections 182 against corresponding surfaces of the mold blank.

Figure 17A:
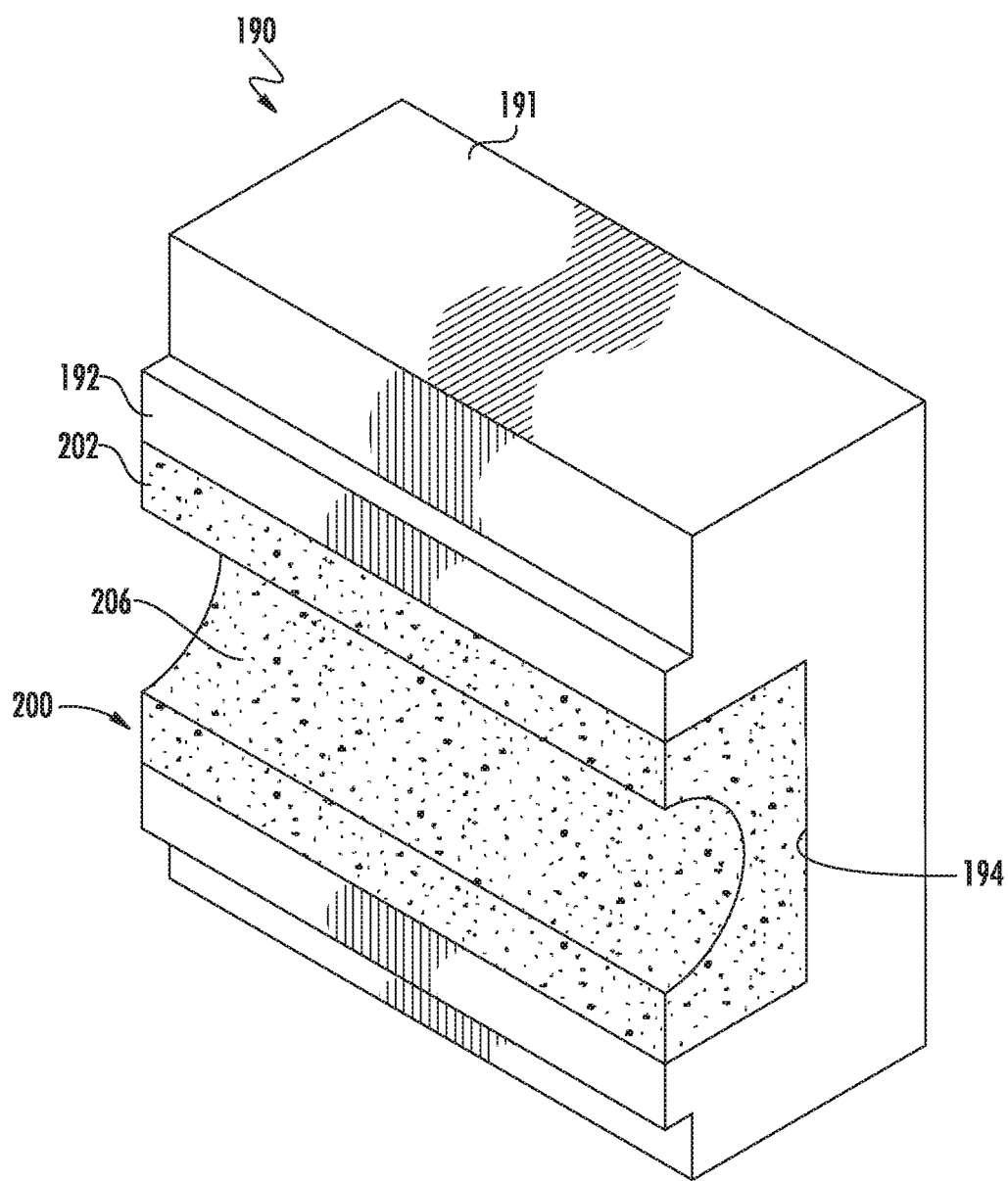
FIG. 17A is a front perspective view illustration of a porous block-type insert received by a first mold blank and being suitable for molding at least a portion of a unitary measuring pipette.
Figure 17B:
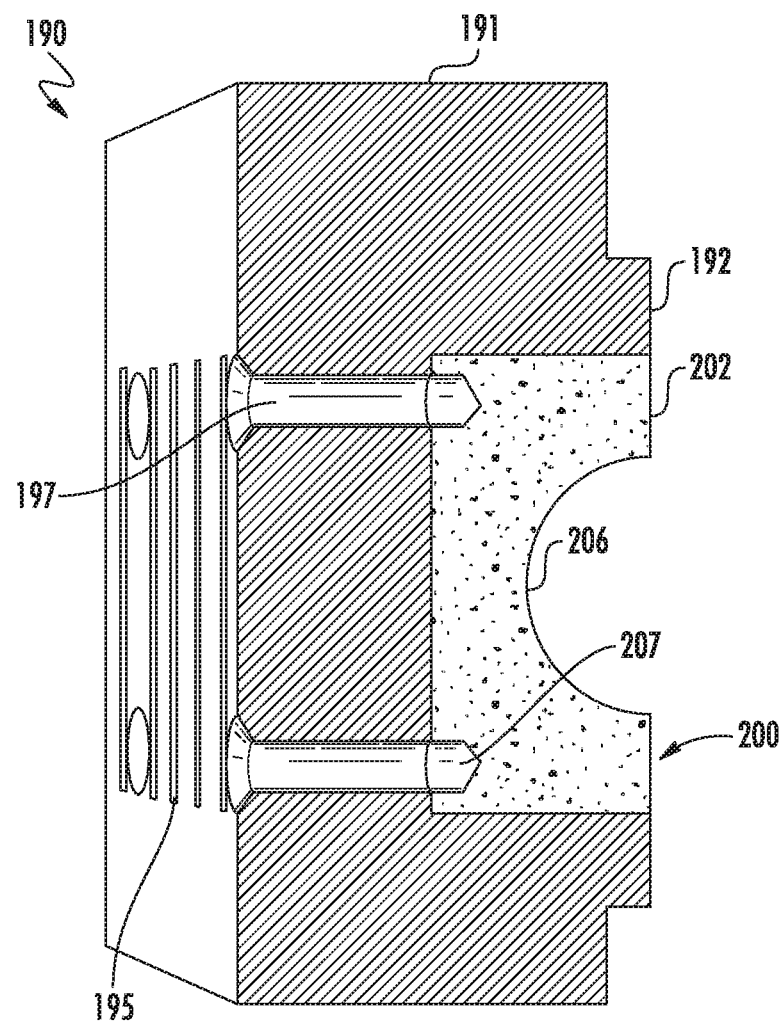
FIG. 17B is a rear perspective, cross-sectional view illustration of the block-type insert and mold blank of FIG. 17A.

FIGS. 17A and 17B illustrate a porous insert 200 received in a cavity 194 defined in a body structure 191 of a mold blank 190, with the body structure 191 further defining a mating surface 192 (e.g., configured to abut a mating surface of another face plate or insert of the same type). The porous insert 200 has a generally rectangular block-like shape, with a curved (e.g., semi-cylindrical) molding surface 206 defined in an otherwise flat face 202 of the porous insert 200. In this regard, the porous insert 200 has a non-constant thickness. The flat face 202 of the porous insert 200 may be substantially coplanar with the mating surface 192 of the mold blank 190. Referring to FIG. 17B, the mold blank 190 defines multiple slot-like vacuum channels 195 therethrough, with such vacuum channels 195 being exposed to gas-permeable pores of the porous insert 200. The mold blank 190 further includes countersunk holes 197 configured to receive screws (not shown) for cooperating with tapped holes 207 defined in the porous insert 200 to enable the porous insert 200 to be removably affixed to the mold blank 190.

Figure 18A:
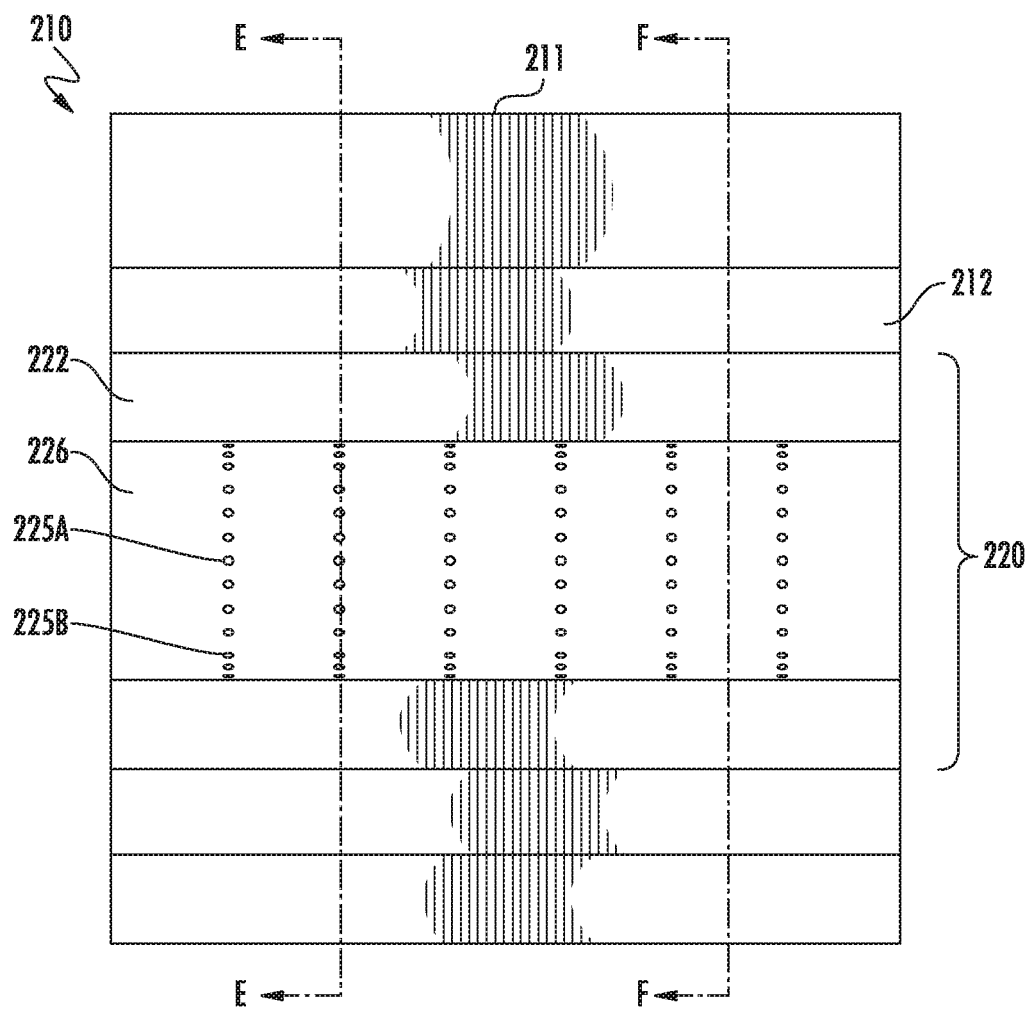
FIG. 18A is a front elevation view illustration of a pinhole array-defining insert received by a mold blank defining multiple slot-like vacuum channels and being suitable for molding at least a portion of a unitary measuring pipette.
Figure 18B:
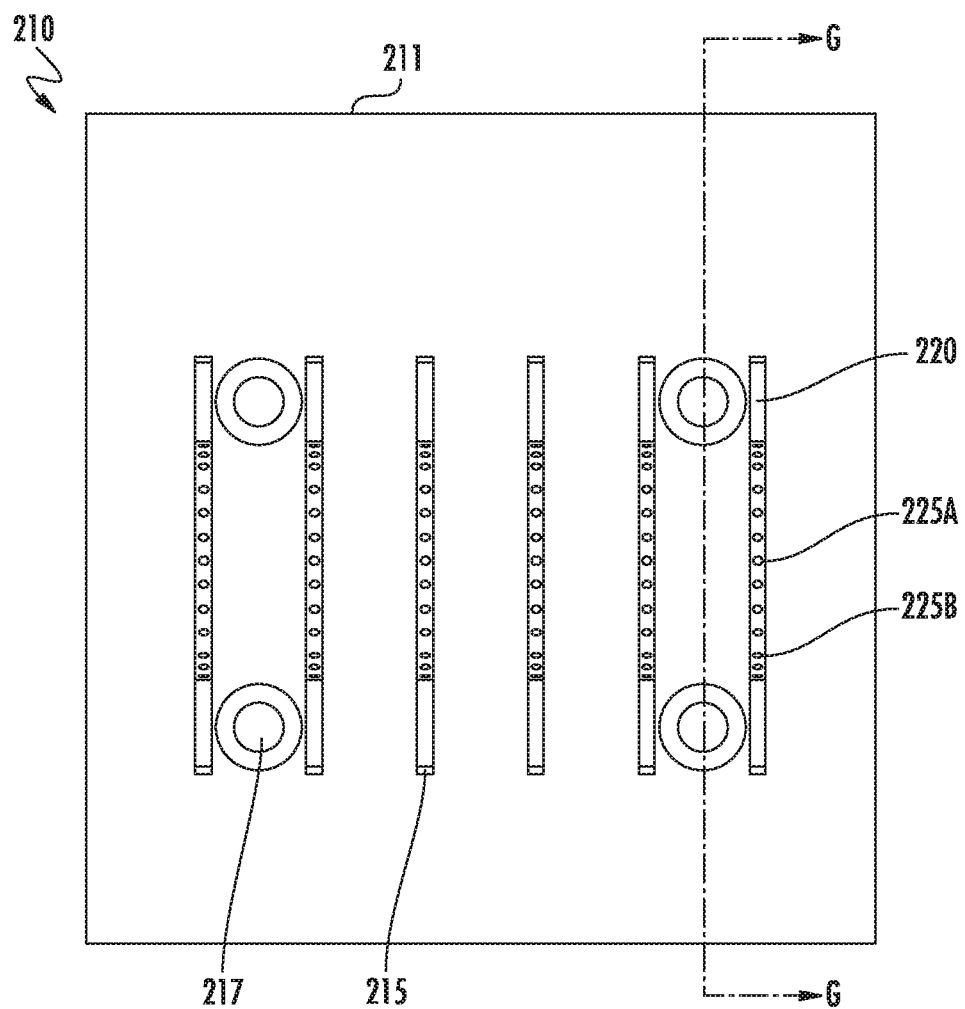
FIG. 18B is a rear elevation view illustration of the pinhole array-defining insert and mold blank of FIG. 18A.
Figure 18C:
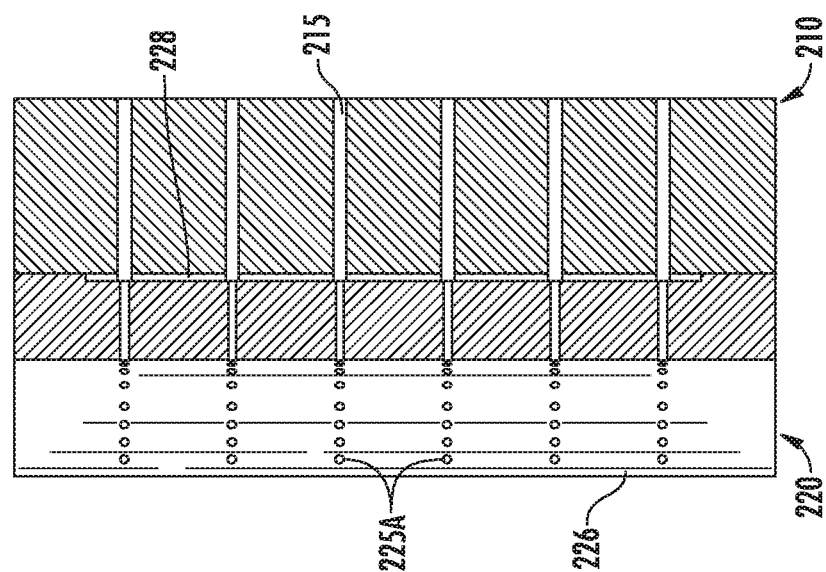
FIG. 18C is a side cross-sectional view illustration of the pinhole array-defining insert and mold blank of FIGS. 18A and 18B, taken along section line "E-E" of FIG. 18A and along section line "G-G" of FIG. 18B.
Figure 18D:
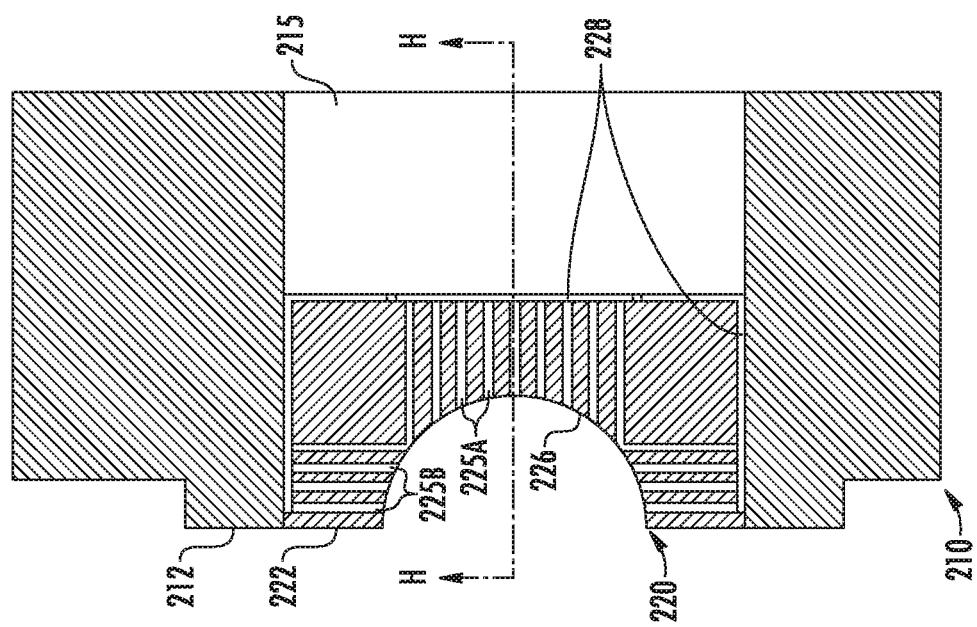
FIG. 18D is an upper cross-sectional view illustration of the pinhole array-defining insert and mold blank of FIGS. 18A-18C, taken along section line "H-H" of FIG. 18C.

FIGS. 18A-18F illustrate an insert 220 defining an array of pinholes 225A, 225B and received by a mold blank 210 that defines multiple slot-like vacuum channels 215, with the insert 220 and mold blank 210 embodying part of an assembly suitable for molding at least a portion of a unitary measuring pipette exhibiting improved surface quality (e.g., reduction or elimination of witness features that are non-parallel to the longitudinal axis and that protrude from an exterior surface of a tubular body of the pipette). FIGS. 18A, 18B, and 18F provide front elevation, rear elevation, and perspective view illustrations, respectively, of the insert 220 received by the mold blank 210. FIG. 18D is an upper cross-sectional view illustration of the insert 220 and mold blank 210, taken along section line "H-H" of FIG. 18C. FIG. 18E is a side cross-sectional view illustration of the insert 220 and mold blank 210, taken along section line "F-F" of FIG. 18A. FIG. 18F is a perspective view illustration of the insert 220 and mold blank 210.

Referring generally to FIGS. 18A-18F, the mold blank 210 includes a body structure 211 defining a mating surface 212 intended to abut a mating surface of another insert of the same type disposed in another mold block (not shown). The insert 220 has a generally rectangular block-like shape, with a curved (e.g., semi-cylindrical) molding surface 226 defined in an otherwise flat face 222 of the insert 220, such that the insert 220 has a non-constant thickness. The flat face 222 of the insert 220 may be substantially coplanar with the mating surface 212 of the mold blank 210. Referring to FIGS. 18B and 18E, the mold blank 210 includes countersunk holes 217 configured to receive screws (not shown) for cooperating with tapped holes 227 defined in the insert 220 to enable the insert 220 to be removably affixed to the mold blank 210. Referring to FIG. 18C, a first group of holes 225A may be defined in a horizontal direction through the curved molding surface 226 (and through an entire thickness of the insert 220), and a second group of holes 225B may be defined in a vertical direction through the curved molding surface 226 (and through an entire thickness of the insert 220). Additionally, peripheral air gaps 228 non-coincident with the flat face 222 of the insert 220 may be provided between a periphery of the insert 220 and the mold blank 222, to permit extraction of gas for any holes of the first and/or second groups of holes 225A, 225B not aligned with the slot-like vacuum channels 215 defined through the mold block 210. Referring to FIG. 18D, certain holes of the first group of holes 225A may be aligned with the gas passages 215, with a peripheral air gap 228 provided between the insert 220 and the mold blank 210. As a result, gaseous contents of a cavity bounded in part by the curved molding surface 226 may be evacuated through the holes 225A, 225B, the gas passages 228, and the slot-like vacuum channels 215 by exposure of the slot-like vacuum channels 215 to subatmospheric conditions (e.g., using a vacuum pump, not shown).

In certain embodiments, an apparatus for vacuum forming at least a portion of a pipette includes first and second mold bodies each composed of multiple mold body sections, wherein the mold body sections of each mold body define a semi-cylindrical molding surface. A first mold body defines a plurality of first vacuum passages extending through the semi-cylindrical first molding surface, and a second mold body defines a plurality of second vacuum passages extending through the semi-cylindrical second molding surface. Within the first mold body, each first mold body section is arranged in contact with an adjacent at least one other first mold body section, wherein a portion of each first mold body section is separated from the adjacent at least one other first mold body section by a different first vacuum passage of the plurality of first vacuum passages. Similarly, within the second mold body, each second mold body section is arranged in contact (e.g., compressively retained, adhered, welded, etc.) with an adjacent at least one other second mold body section, wherein a portion of each second mold body section is separated from the adjacent at least one other second mold body section by a different second vacuum passage of the plurality of second vacuum passages. The second mold body is configured to cooperate with the first mold body to cause the semi-cylindrical first molding surface and the semi-cylindrical second molding surface to form a substantially continuous molding surface. Each vacuum passage comprises a maximum width of no greater than 150 microns (or optionally, a maximum width in a range of from 10 to 100 microns, or in a range of from 10 to 50 microns). In certain embodiments, vacuum passages correspond to recesses defined in the mold body sections, wherein such recesses may be defined by any suitable material removal processes such as cutting, grinding, or the like. In certain embodiments, each vacuum passage comprises a maximum length of at least ten times the maximum width. In certain embodiments, each vacuum passage includes a length extending substantially parallel to a longitudinal axis (which is definable along a center of an imaginary cylinder bounded by the semi-cylindrical first and second molding surfaces) and extending substantially perpendicular to the maximum width. In other embodiments, each vacuum passage includes a length extending substantially perpendicular to the longitudinal axis and extending substantially parallel to the maximum width. Optionally, each vacuum passage may be bounded by edges having non-square (e.g., radiuses or chamfered) corners.

FIGS. 19A and 19C illustrate a mold body 230 including vacuum passages 235 embodied in multiple narrow, transversely extending slots 235 previously defined as transverse recesses between individual mold body sections. The mold body 230 includes a body structure 231 having a generally rectangular block-like shape, with a curved (e.g., semi-cylindrical) molding surface 236 defined in an otherwise flat face 232 of the body structure 231. Each transversely extending slot 235 preferably has a maximum width of no greater than 150 microns (or in a range of from 10 to 100 microns, or in a subrange of from 10 to 50 microns), comprises a maximum length of at least ten times the maximum width, and extends through an entire thickness of the body structure 231. The mold body 230 is intended to mate with another mold body (not shown) along each flat face 232 thereof, to form a cylindrical cavity (not shown) bounded by the molding surface 236 of each mold body 230. During a vacuum forming operation, the vacuum passages 235 (configured as transversely extending slots 235) may be used to extract gas from the cylindrical cavity by exposure of the vacuum passages 235 to subatmospheric conditions (e.g., using a vacuum pump, not shown).

FIG. 19B provides schematic front elevation view illustrations of two mold body precursor sections 241 defining transverse recesses 243, during assembly (at left) and after being compressively retained or joined to one another (at right) to form an aggregated structure 244 having a transverse channel 245. Such precursor sections 241 and aggregated structure 244 are useable to form a mold body similar to the mold body 230 of FIGS. 19A and 19C. In particular, the transverse recesses 243 may be formed by any suitable material removal processes such as cutting, grinding, or the like, without necessarily requiring advanced material removal techniques such as EDM, laser cutting, or etching capable of defining microscale features. Restated, defining thin transverse recesses 243 between individual precursor sections 241 followed by joining of such sections (either removably (such as by compressive retention) or permanently (such as by anodic bonding, welding, adhesion, etc.)) to form the aggregated structure 244 permits transverse channels 245 of very small width to be formed without advanced tooling. In certain embodiments, the aggregated structure 244 may be subjected to one or more shaping (e.g., material removal) operations after the aggregated structure 244 is formed, such as to produce the curved (e.g., semi-cylindrical) molding surface 236 shown in FIG. 19C.

FIGS. 20A and 20C illustrate a mold body 250 including vacuum passages 255 embodied in multiple narrow, longitudinally extending slots 255 previously defined as longitudinal recesses between individual mold body sections. The mold body 250 includes a body structure 251 having a generally rectangular block-like shape, with a curved (e.g., semi-cylindrical) molding surface 256 defined in an otherwise flat face 252 of the body structure 251. Each longitudinally extending slot 255 preferably has a maximum width of no greater than 150 microns (or in a range of from 10 to 100 microns, or in a subrange of from 10 to 50 microns), comprises a maximum length of at least ten times the maximum width, and extends through an entire thickness of the body structure 251. The mold body 250 is intended to mate with another mold body (not shown) along each flat face 252 thereof, to form a cylindrical cavity (not shown) bounded by the molding surface 256 of each mold body 250. During a vacuum forming operation, the vacuum passages 255 (configured as longitudinally extending slots 255) may be used to extract gas from the cylindrical cavity by exposure of an extension passage 258 (which is in fluid communication with the vacuum passages 255) to subatmospheric conditions, such as by using a vacuum pump (not shown).

FIG. 20B provides schematic front elevation view illustrations of two mold body precursor sections 261 defining longitudinal recesses 263, during assembly (at bottom) and after being compressively retained or joined to one another (at top) to form an aggregated structure 264 having a longitudinal channel 265. Such precursor sections 261 and aggregated structure 265 are useable to form a mold body similar to the mold body 250 of FIGS. 20A and 20C. The longitudinal recesses 263 may be formed in the same manner described in connection with the transverse recesses 243 of FIG. 19B. Defining thin longitudinal recesses 263 between individual precursor sections 261 followed by joining of such sections (either removably (such as by compressive retention) or permanently (such as by anodic bonding, welding, adhesion, etc.)) to form the aggregated structure 264 permits longitudinal channels 265 of very small width to be formed without advanced tooling. In certain embodiments, the aggregated structure 264 may be subjected to one or more shaping (e.g., material removal) operations after the aggregated structure 264 is formed, such as to produce the curved (e.g., semi-cylindrical) molding surface 256 shown in FIG. 20C.

In certain embodiments, one or more mold body sections of porous material may be used in combination with one or more mold body sections of non-porous material to form a mold body, where recesses serving as additional vacuum passages may optionally be provided one or more mold body sections.

Figure 21C:
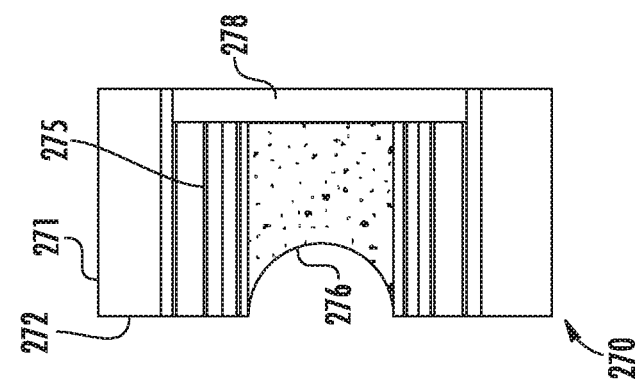
FIG. 21C is a side elevation view illustration of the mold body of FIG. 21A.
Figure 21B:
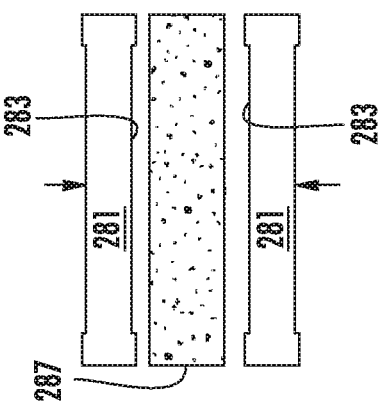
FIG. 21B is a schematic front elevation assembly view illustration of a porous mold body precursor section arranged between two non-porous mold body precursor sections defining longitudinal recesses, with the mold body precursor sections being useable to form a mold body similar to the mold body of FIG. 21A.
Figure 21A:
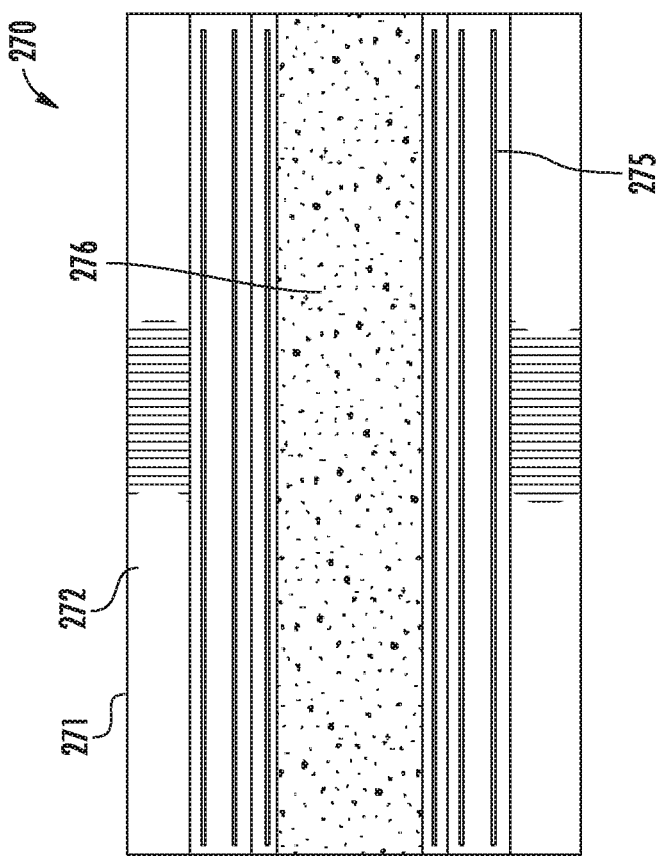
FIG. 21A is a front elevation view illustration of a mold body composed of multiple mold body sections including a porous mold body section arranged between non-porous mold body sections that define longitudinal recesses to form longitudinal slots between individual mold body sections.

FIGS. 21A and 21C illustrate a mold body 270 composed of multiple mold body sections including a porous mold body section arranged between non-porous mold body sections, with multiple longitudinal vacuum passages 275 previously defined as longitudinal recesses between individual mold body sections. The mold body 270 includes a body structure 271 having a generally rectangular block-like shape, with a curved (e.g., semi-cylindrical) molding surface 276 that is defined bounded by porous material and is recessed relative to an otherwise flat face 272 of the body structure 271. Each longitudinally extending slot 275 preferably has a maximum width of no greater than 150 microns (or in a range of from 10 to 100 microns, or in a subrange of from 10 to 50 microns), comprises a maximum length of at least ten times the maximum width, and may extend through an entire thickness of the body structure 271. The mold body 270 is intended to mate with another mold body (not shown) along each flat face 272 thereof, to form a cylindrical cavity (not shown) bounded by the molding surface 276 of each mold body 270. During a vacuum forming operation, the porous material bounding the molding surface 276 may be used to extract gas from the cylindrical cavity by exposure of an extension passage 278 (shown in FIG. 21C) to subatmospheric conditions (e.g., using a vacuum pump, not shown). Optionally, the longitudinal vacuum passages 275 may be used to permit gaseous communication between mold bodies when two mold bodies 270 are mated to one another.

FIG. 21B is a schematic front elevation assembly view illustration of a porous mold body precursor section 287 arranged between two non-porous mold body precursor sections 281 defining longitudinal recesses 283, with the mold body precursor sections 281, 287 being useable to form a mold body similar to the mold body 270 of FIGS. 21A and 21C. The longitudinal recesses 283 may be formed in the same manner described in the prior embodiment (e.g., connection with formation of the transverse recesses 243 shown in FIG. 19B). In certain embodiments, an aggregated structure formable by the mold body precursor sections 281, 287 may be subjected to one or more shaping (e.g., material removal) operations after the aggregated structure is formed, such as to produce the curved (e.g., semi-cylindrical) molding surface 276 shown in FIG. 21C.

In certain embodiments, gas-permeable apertures defined in a molding surface of a face plate, insert, or mold body section may be formed as to be bounded by chamfered or radiused (e.g., non-square) corners, since provision of non-square corners may serve to reduce the height of any raised witness features subject to being formed in such apertures during a vacuum forming operation. Such chamfering or radiusing of corners may be performed in addition to, or as an alternative to, reducing dimensions of the gas permeable apertures in order to reduce or eliminate circumferential witness features. In certain embodiments, providing non-square corners of edges of each gas aperture defined in a molding surface is configured to impart a witness feature having a maximum lengthwise dimension non-parallel to a longitudinal axis of the tubular body and having a height in a range of from 0 mm to 0.02 mm.

Figure 22A:
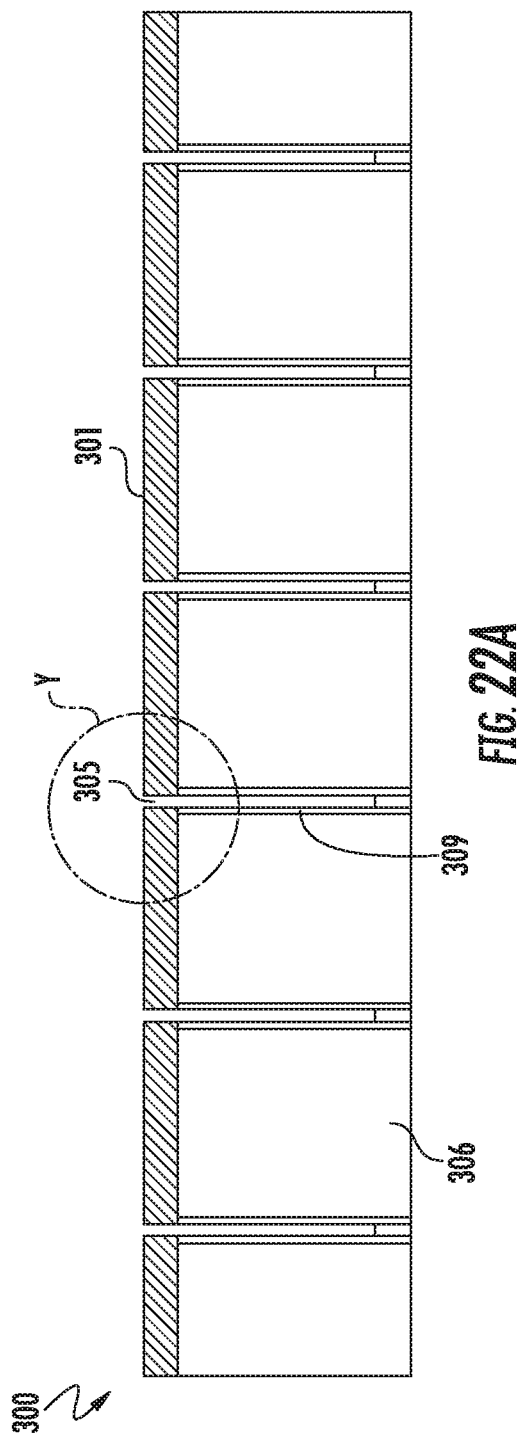
FIG. 22A is a side elevation view of a portion of a face plate or insert including gas permeable apertures embodied in multiple narrow, transversely extending slots bounded by radiused (i.e., non-square) corners.
Figure 22B:
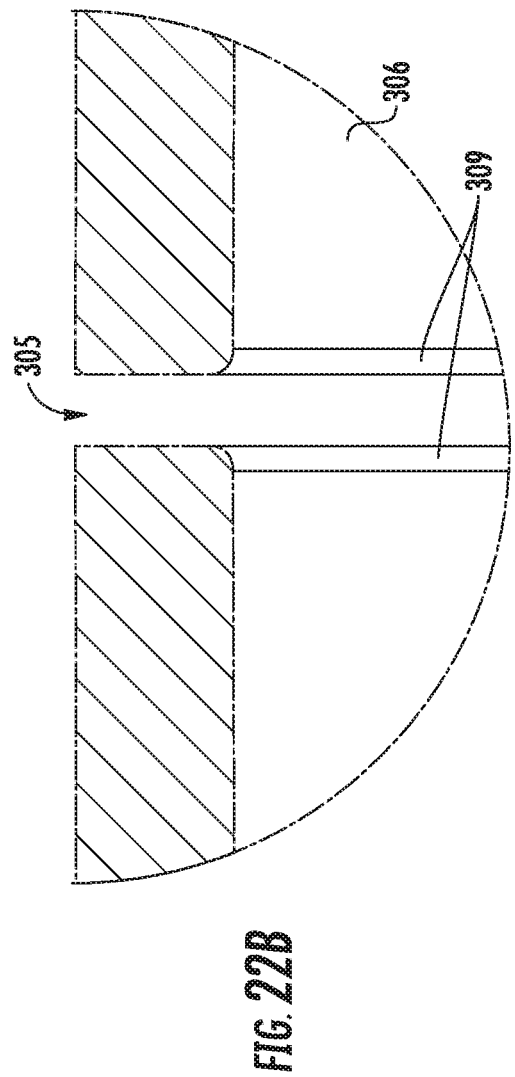
FIG. 22B is a magnified excerpt of FIG. 22A, indicated by dashed circle "Y" of FIG. 22A.

FIG. 22A is a side elevation view of a portion of a face plate or insert 300 having a body structure 301 and including gas permeable apertures 305 embodied in multiple narrow, transversely extending slots 305 defined in a molding surface 306, wherein the transversely extending slots 305 are bounded by radiused (i.e., non-square) corners 309. FIG. 22B is a magnified excerpt of FIG. 22A, indicated by dashed circle "Y" of FIG. 22A. In certain embodiments, the transversely extending slots 305 have a maximum width of no greater than 150 microns (or in a range of from 10 to 100 microns, or in a range of from 10 to 50 microns). In certain embodiments, a radius of each radiused corner 309 is in a range of about 0.2 to about 1, in a range of about 0.25 to about 0.5, times a nominal width of an adjacent transversely extending slot 305.

Figure 23:
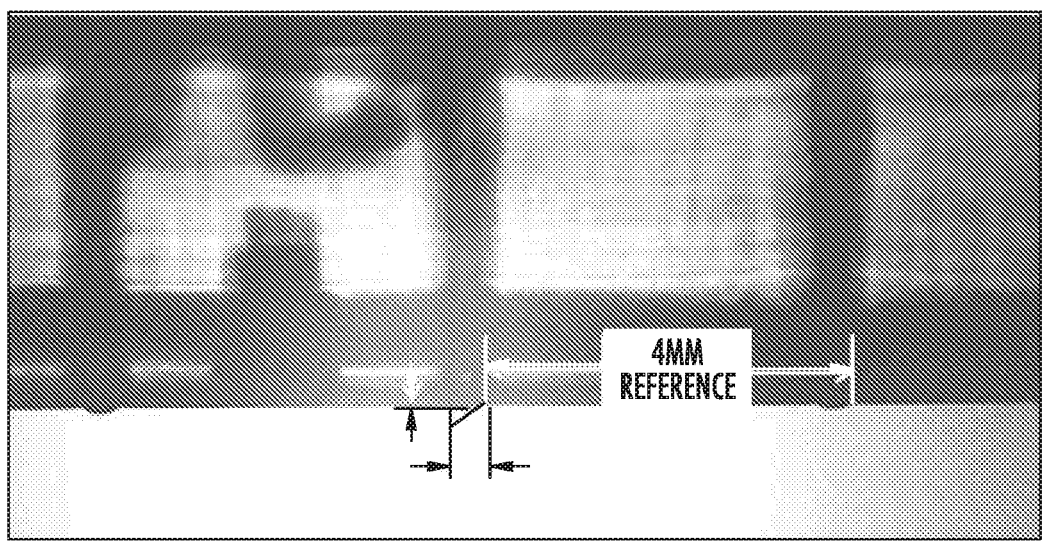
FIG. 23 is a magnified elevation view microscope image of an edge portion of a conventional vacuum formed pipette showing three raised circumferential witness features each being spaced 4 mm apart, each having a maximum height dimension of about 0.07 mm, with the witness features being produced by gas permeable apertures embodied in transversely extending slots bounded by square corners, and with dimensioning lines proximate to centermost witness feature.

FIG. 23 is a magnified elevation view 20× magnification microscope image of an edge portion of a conventional vacuum molded pipette showing three raised circumferential witness features (shown as three wide vertical lines, as well as downwardly extending dark "bumps" at bottom, in FIG. 23) produced by vacuum forming in a mold having gas permeable apertures embodied in transversely extending slots bounded by square corners. Each witness feature was spaced about 4 mm apart, had a width of about 0.3 to about 0.4 mm, and had a maximum height dimension of about 0.07 mm. To obtain the height and width dimensions, an optical comparator produced a silhouette on a screen, and the profile of the silhouette was measured with reference lines. Dimensioning lines are provided in FIG. 23 proximate to the centermost witness feature. A printed numerical volume value is also visible between the leftmost and center witness features in FIG. 23.

Figure 24A:
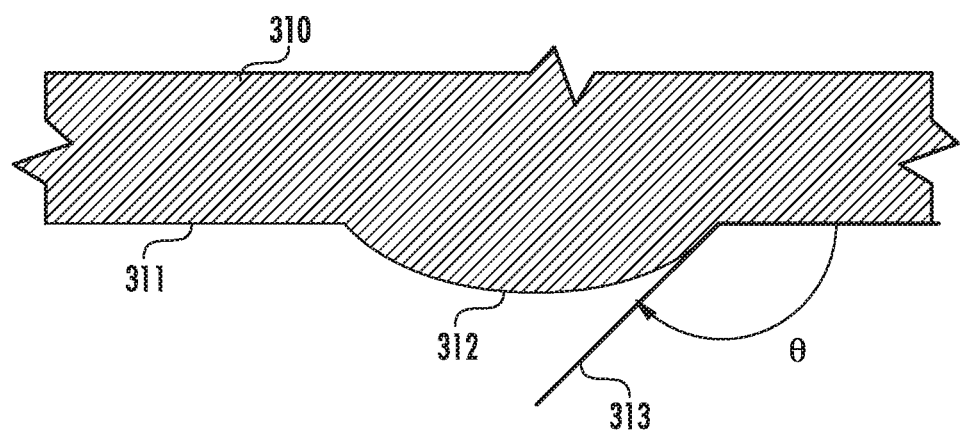
FIG. 24A is an elevation view illustration of a portion of a vacuum formed pipette wall including a raised circumferential witness feature having a shape corresponding to the witness feature shown in FIG. 23, with a superimposed tangent line and obtuse angle relative to the pipette wall.
Figure 24B:
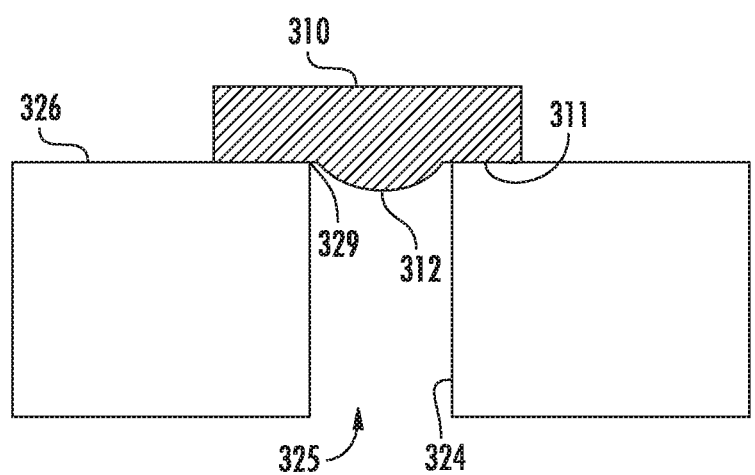
FIG. 24B is an elevation view illustration of the vacuum formed pipette wall portion of FIG. 24A positioned proximate to a transversely extending slot bounded by square corners.

FIG. 24A is an elevation view illustration of a portion of a vacuum formed pipette wall 310 including a raised circumferential witness feature 312 having a shape corresponding to the witness features shown in FIG. 23, with a superimposed tangent line 313 and (obtuse) transition angle θ relative to a straight portion 311 of the pipette wall 310. FIG. 24A is an illustration corresponding to a silhouette image captured according to the technique described in connection with FIG. 23. The transition angle θ between the straight portion 311 of the pipette wall 310 and the raised circumferential witness feature 312 was observed to be about 147 degrees from the silhouette image. The raised circumferential witness feature 312 was generated during a vacuum forming process by incursion of softened thermoplastic material into a vacuum channel embodied in a transversely extending slot bounded by square corners. FIG. 24B is an elevation view illustration of the vacuum formed pipette wall portion 310 (having a circumferential witness feature 312 that is elevated relative to a straight portion 311 of the pipette wall 310) of FIG. 24A, with the pipette wall portion 310 being positioned proximate to a transversely extending slot 325. The transversely extending slot 325 is bounded by square corners 329 (each extending between a molding surface 326 and a slot-defining surface 324 that is perpendicular to the molding surface 326). It is believed that the square corners 329 tend to affect the shape and dimensions of the circumferential witness feature 312.

Figure 25A:
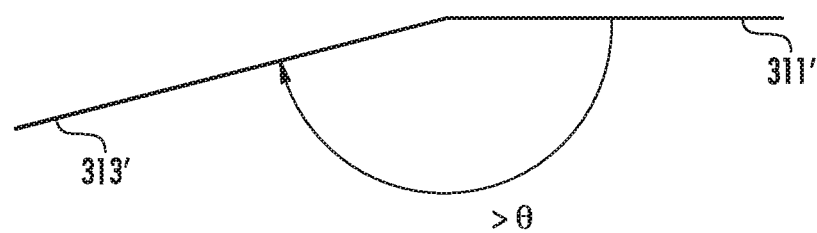
FIG. 25A is an elevation view illustration of an obtuse angle definable between a (horizontal) pipette wall and a line representing a tangent to a low-height circumferential witness feature of a pipette wall obtained by vacuum forming using a face plate or insert having a gas passage embodied in a transversely extending slot bounded by chamfered (i.e., non-square) corners.
Figure 25B:
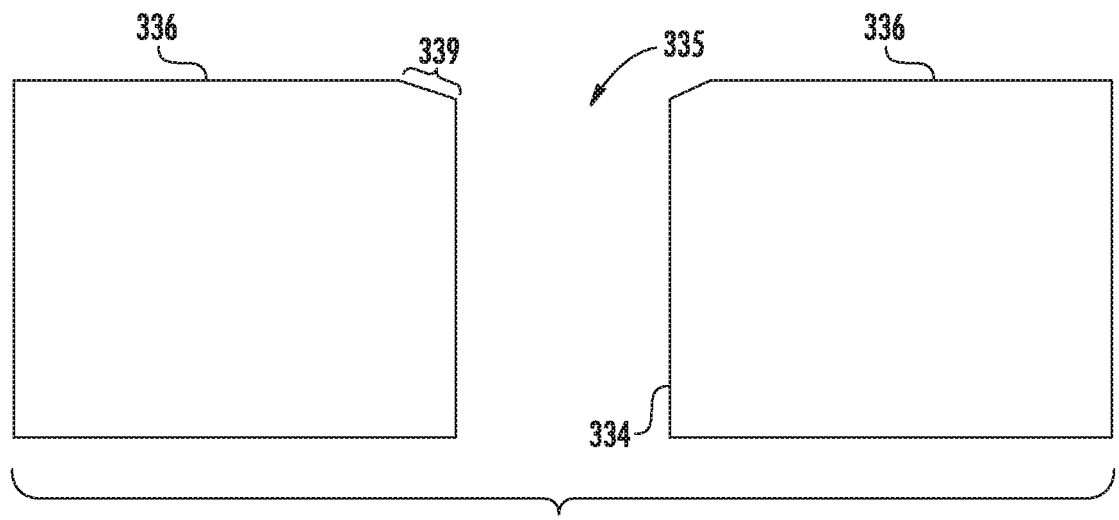
FIG. 25B is an elevation view of a portion of a face plate or insert having a gas permeable aperture embodied in a transversely extending slot bounded by chamfered (i.e., non-square) corners, useable for vacuum forming a pipette having reduced height circumferential witness features.

FIG. 25A is an elevation view illustration of an obtuse angle (>0) definable between a (horizontal) pipette wall 311' and a line 313' parallel to the expected transition to a reduced-height circumferential witness feature of a pipette wall obtained by vacuum forming, using a face plate or insert having a gas passage embodied in a transversely extending slot bounded by chamfered or radius (i.e., non-square) corners. It is believed that the obtuse angle (>0) of FIG. 25A may be greater than 147 degrees (thereby resulting in a reduced height witness feature) if chamfered or radiused corners along gas permeable apertures are used. FIG. 25B is an elevation view of a portion of a face plate or insert having a molding surface 336 defining a gas permeable aperture 335 embodied in a transversely extending slot bounded by chamfered (i.e., non-square) corners 339, useable for vacuum forming a pipette having reduced height circumferential witness features. Each chamfered corner 339 represents an intermediate angle between a slot-defining surface 334 that is perpendicular to the molding surface 336.

Apparatuses and methods disclosed herein are suitable for forming pipettes with reduction in height or elimination of features that are non-parallel to the longitudinal axis and that protrude from an exterior surface of the tubular body. For example, a pipette producible by a method such as vacuum forming using an apparatus disclosed herein may include a tubular body of biaxially oriented thermoplastic material with a nominal thickness of no greater than 0.5 mm, wherein any optionally present witness features, protruding from an exterior surface of the tubular body in a direction non-parallel to a longitudinal axis thereof, comprise a reduced height (e.g., maximum height of no greater than about 0.02 mm (200 microns), or no greater than about 0.01 mm (100 microns)). In certain embodiments, the nominal thickness of the tubular body is no greater than about 0.5 mm, is no greater than about 0.35 mm, or is in a range of from about 0.25 mm to about 0.5 mm. In certain embodiments, any optionally present witness features, protruding from the exterior surface of the tubular body and having a maximum lengthwise dimension non-parallel to the longitudinal axis, comprise a height of no greater than about 0.01 mm. In certain embodiments, the pipette is devoid of witness features protruding from the exterior surface of the tubular body. In certain embodiments, the exterior surface of the tubular body comprises a plurality of graduated markings corresponding to volumetric capacity of portions of an interior of the tubular body. In certain embodiments, at least the tubular body, or the entirety of the pipette, is produced by vacuum forming.

In certain embodiments, longitudinally oriented gas-permeable apertures (e.g., longitudinal slots) defined in a molding surface of a vacuum forming apparatus may be used to reduce interference between witness features and graduated volumetric markings on an outside surface of the tubular body of a pipette. Thus, in certain embodiments, a pipette comprises a tubular body of biaxially oriented thermoplastic material arranged between a tip and a mouthpiece, with a longitudinal axis extending between the tip and the mouthpiece, wherein the pipette includes at least three longitudinally oriented witness features protruding from an exterior surface of the tubular body. In particular, each witness feature of the at least three witness features has a maximum lengthwise dimension that is substantially parallel to the longitudinal axis, and is radially spaced apart from each other witness feature of the at least three witness features. In certain embodiments, the nominal thickness of the tubular body is no greater than about 0.5 mm, is no greater than about 0.35 mm, or is in a range of from about 0.25 mm to about 0.5 mm. In certain embodiments, the exterior surface of the tubular body comprises a plurality of graduated markings corresponding to volumetric capacity of portions of an interior of the tubular body. In certain embodiments, at least the tubular body, or the entirety of the pipette, is produced by vacuum forming.

According to an aspect (1) of the present disclosure, a pipette is provided. The pipette comprises: a tubular body arranged between a tip and a mouthpiece, and having a longitudinal axis extending between the tip and the mouthpiece; wherein the tubular body comprises a biaxially oriented thermoplastic material; wherein the tubular body comprises a nominal thickness of no greater than 0.5 mm; and wherein any optionally present witness features, protruding from an exterior surface of the tubular body and having a maximum lengthwise dimension non-parallel to the longitudinal axis, comprise a maximum height of no greater than about 0.02 mm.

According to an aspect (2) of the present disclosure, the pipette of aspect (1) is provided, wherein the nominal thickness of the tubular body is no greater than about 0.35 mm.

According to an aspect (3) of the present disclosure, the pipette of aspect (1) is provided, wherein the nominal thickness of the tubular body is in a range of from about 0.25 mm to 0.5 mm.

According to an aspect (4) of the present disclosure, the pipette of any of aspects (1)-(3) is provided, wherein the pipette is devoid of witness features protruding from the exterior surface of the tubular body.

According to an aspect (5) of the present disclosure, the pipette of any of aspects (1)-(3) is provided, wherein any optionally present witness features, protruding from the exterior surface of the tubular body and having a maximum lengthwise dimension non-parallel to the longitudinal axis, comprise a height of no greater than about 0.01 mm.

According to an aspect (6) of the present disclosure, the pipette of any of aspects (1)-(5) is provided, wherein the exterior surface of the tubular body comprises a plurality of graduated markings corresponding to volumetric capacity of portions of an interior of the tubular body.

According to an aspect (7) of the present disclosure, the pipette of any of aspects (1)-(6) is provided, wherein the tubular body is produced by vacuum forming.

According to an aspect (8) of the present disclosure, a is provided. The pipette comprises: a tubular body arranged between a tip and a mouthpiece, and having a longitudinal axis extending between the tip and the mouthpiece; and at least three witness features protruding from an exterior surface of the tubular body, wherein each witness feature of the at least three witness features has a maximum lengthwise dimension that is substantially parallel to the longitudinal axis, and is radially spaced apart from each other witness feature of the at least three witness features; wherein the tubular body comprises a biaxially oriented thermoplastic material.

According to an aspect (9) of the present disclosure, the pipette of aspect (1) is provided, wherein the nominal thickness of the tubular body is no greater than 0.5 mm.

According to an aspect (10) of the present disclosure, the pipette of any of aspects (8)-(9) is provided, wherein the nominal thickness of the tubular body is no greater than about 0.35 mm.

According to an aspect (11) of the present disclosure, the pipette of any of aspects (8)-(9) is provided, wherein the nominal thickness of the tubular body is in a range of from about 0.25 mm to 0.5 mm.

According to an aspect (12) of the present disclosure, the pipette of any of aspects (8)-(11) is provided, wherein the exterior surface of the tubular body comprises a plurality of graduated markings corresponding to volumetric capacity of portions of an interior of the tubular body.

According to an aspect (13) of the present disclosure, the pipette of any of aspects (8)-(12) is provided, wherein the tubular body is formed by vacuum forming.

According to an aspect (14) of the present disclosure, an apparatus for vacuum forming a hollow tubular body of a pipette. The apparatus comprises: a first mold blank defining at least one first vacuum channel and defining at least one first recess; a second mold blank defining at least one second vacuum channel and defining at least one second recess; a first face plate or insert received by the at least one first recess and including a semi-cylindrical first molding surface defining a plurality of gas-permeable first apertures or pores in fluid communication with the at least one first vacuum channel; and a second face plate or insert received by the at least one second recess and including a semi-cylindrical second molding surface defining a plurality of gas-permeable second apertures or pores in fluid communication with the at least one second vacuum channel; wherein each aperture or pore of the plurality of gas-permeable first apertures or pores and of the plurality of gas-permeable second apertures or pores comprises a maximum width or diameter of no greater than 150 microns.

According to an aspect (15) of the present disclosure, the apparatus of aspect (14) is provided, wherein each aperture or pore of the plurality of gas-permeable first apertures or pores and of the plurality of gas-permeable second apertures or pores comprises a maximum width or diameter in a range of from 10 microns to 100 microns.

According to an aspect (16) of the present disclosure, the apparatus of any of aspects (14)-(15) is provided, wherein: the first face plate or insert and the second face plate or insert comprise sintered porous material; the semi-cylindrical first molding surface defines a plurality of gas-permeable first pores; and the semi-cylindrical second molding surface defines a plurality of gas-permeable second pores.

According to an aspect (17) of the present disclosure, the apparatus of any of aspects (14)-(15) is provided, wherein: the first face plate or insert and the second face plate or insert comprise a non-porous material; the semi-cylindrical first molding surface defines a plurality of gas-permeable first apertures, and the plurality of gas-permeable first apertures extend through an entire thickness of the first face plate or insert; and the semi-cylindrical second molding surface defines a plurality of gas-permeable second apertures, and the plurality of gas-permeable second apertures extend through an entire thickness of the second face plate or insert.

According to an aspect (18) of the present disclosure, the apparatus of aspect (17) is provided, wherein each aperture of the plurality of gas-permeable first apertures and of the plurality of gas-permeable second apertures comprises a maximum width of no greater than 150 microns, and comprises a maximum length of at least ten times the maximum width.

According to an aspect (19) of the present disclosure, the apparatus of aspect (18) is provided, wherein a length of each aperture of the plurality of gas-permeable first apertures and of the plurality of gas-permeable second apertures is oriented substantially parallel to a longitudinal axis definable along a center of an imaginary cylinder bounded by the semi-cylindrical first molding surface and the semi-cylindrical second molding surface.

According to an aspect (20) of the present disclosure, the apparatus of aspect (18) is provided, wherein a length of each aperture of the plurality of gas-permeable first apertures and of the plurality of gas-permeable second apertures is oriented substantially perpendicular to a longitudinal axis definable along a center of an imaginary cylinder bounded by the semi-cylindrical first molding surface and the semi-cylindrical second molding surface.

According to an aspect (21) of the present disclosure, the apparatus of any of aspects (17)-(20), wherein: the plurality of gas-permeable first apertures includes an array of gas-permeable first apertures in the first face plate or insert; and the plurality of gas-permeable second apertures includes an array of gas-permeable second apertures in the second face plate or insert.

According to an aspect (22) of the present disclosure, the apparatus of any of aspects (17)-(21) is provided, wherein each aperture of the plurality of gas-permeable first apertures and of the plurality of gas-permeable second apertures is bounded by an edge having a non-square corner.

According to an aspect (23) of the present disclosure, the apparatus of any of aspects (17)-(22) is provided, wherein in use of the apparatus including application of subatmospheric pressure condition to vacuum thermoform a heated parison or preform to form the tubular body, the non-square corner of the edge of each aperture is configured to impart a witness feature having a maximum lengthwise dimension non-parallel to a longitudinal axis of the tubular body and having a height in a range of from 0 mm to 0.02 mm.

According to an aspect (24) of the present disclosure, a method for producing a pipette using the apparatus of any of aspects (14)-(23) is provided. The method comprises: inserting a parison or preform into a mold bounded by the semi-cylindrical first molding surface and the semi-cylindrical second molding surface, the parison or preform having a longitudinal axis and a curved inner surface enclosing a space; and applying subatmospheric pressure to the at least one first vacuum channel and to the at least one second vacuum channel, and vacuum forming the parison or preform to conform to the semi-cylindrical first and second molding surfaces, thereby producing a hollow tubular body of the pipette.

According to an aspect (25) of the present disclosure, the method of aspect (24) is provided, further comprising extruding a polymer melt to form the parison or preform.

According to an aspect (26), an apparatus for vacuum forming a hollow tubular body of a pipette is provided. The apparatus comprises: a first mold body comprising a plurality of first mold body sections defining a semi-cylindrical first molding surface and defining a plurality of first vacuum passages extending through the semi-cylindrical first molding surface, wherein each first mold body section of the plurality of first mold body sections is arranged in contact with an adjacent at least one other first mold body section of the plurality of first mold body sections, and wherein a portion of each first mold body section is separated from the adjacent at least one other first mold body section by a different first vacuum passage of the plurality of first vacuum passages; and a second mold body comprising a plurality of second mold body sections defining a semi-cylindrical second molding surface and defining a plurality of second vacuum passages extending through the semi-cylindrical second molding surface, wherein each second mold body section of the plurality of second mold body sections is arranged in contact with an adjacent at least one other second mold body section of the plurality of second mold body sections, and wherein a portion of each second mold body section is separated from the adjacent at least one other second mold body section by a different second vacuum passage of the plurality of second vacuum passages; wherein the second mold body is configured to cooperate with the first mold body to cause the semi-cylindrical first molding surface and the semi-cylindrical second molding surface to form a substantially continuous molding surface; and wherein each first vacuum passage of the plurality of first vacuum passages and each second vacuum passage of the plurality of second vacuum passages comprises a maximum width of no greater than 150 microns.

According to an aspect (27) of the present disclosure, the apparatus of aspect (26) is provided, wherein each first vacuum passage of the plurality of first vacuum passages and each second vacuum passage of the plurality of second vacuum passages comprises a maximum width in a range of from 10 microns to 100 microns.

According to an aspect (28) of the present disclosure, the apparatus of any of aspects (26)-(27) is provided, wherein each first vacuum passage of the plurality of first vacuum passages and each second vacuum passage of the plurality of second vacuum passages comprises a maximum length of at least ten times the maximum width.

According to an aspect (29) of the present disclosure, the apparatus of any of aspects (26)-(28) is provided, wherein: first mold body sections of the plurality of first mold body sections are joined or compressively retained against one another to form the first mold body; and second mold body sections of the plurality of second mold body sections are joined or compressively retained against one another to form the second mold body.

According to an aspect (30) of the present disclosure, the apparatus of any of aspects (26)-(29) is provided, wherein: a longitudinal axis is definable along a center of an imaginary cylinder bounded by the semi-cylindrical first molding surface and by the semi-cylindrical second molding surface; each first mold body section of the plurality of first mold body sections and each second mold body section of the plurality of second mold body sections includes a length oriented substantially parallel to the longitudinal axis; and each first vacuum passage of the plurality of first vacuum passages and each second vacuum passage of the plurality of second vacuum passages includes a length extending substantially parallel to the longitudinal axis and extending substantially perpendicular to the maximum width.

According to an aspect (31) of the present disclosure, the apparatus of any of aspects (26)-(30) is provided, wherein: a longitudinal axis is definable along a center of an imaginary cylinder bounded by the semi-cylindrical first molding surface and by the semi-cylindrical second molding surface; each first mold body section of the plurality of first mold body sections and each second mold body section of the plurality of second mold body sections includes a length oriented substantially perpendicular to the longitudinal axis; and each first vacuum passage of the plurality of first vacuum passages and each second vacuum passage of the plurality of second vacuum passages includes a length extending substantially perpendicular to the longitudinal axis and extending substantially parallel to the maximum width.

According to an aspect (32) of the present disclosure, a method for producing a pipette using the apparatus of any of aspects (26)-(31) is provided. The method comprises:

the method comprising: inserting a parison or preform into a mold bounded by the semi-cylindrical first molding surface and the semi-cylindrical second molding surface, the parison or preform having a longitudinal axis and a curved inner surface enclosing a space; and applying subatmospheric pressure to the plurality of first vacuum passages and to the plurality of second vacuum passages, and vacuum forming the parison or preform to conform to the semi-cylindrical first and second molding surfaces, thereby producing a hollow tubular body of the pipette.

According to an aspect (33) of the present disclosure, the method of aspect (32) is provided, further comprising extruding a polymer melt to form the parison or preform.

In further aspects of the disclosure, it is specifically contemplated that any two or more aspects, embodiments, or features disclosed herein may be combined for additional advantage.

As used herein, the singular forms "a," "an" and "the" include plural referents unless the context clearly dictates otherwise. Thus, for example, reference to a "notch" includes examples having two or more such "notches" unless the context clearly indicates otherwise The term "include" or "includes" means encompassing but not limited to, that is, inclusive and not exclusive.

"Optional" or "optionally" means that the subsequently described event, circumstance, or component, can or cannot occur, and that the description includes instances where the event, circumstance, or component, occurs and instances where it does not.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of" are implied.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

The invention claimed is:

1. An apparatus for vacuum forming a hollow tubular body of a pipette, the apparatus comprising:
  a first mold blank defining at least one first vacuum channel and defining at least one first recess;
  a second mold blank defining at least one second vacuum channel and defining at least one second recess;
  a first face plate or insert received by the at least one first recess and including a semi-cylindrical first molding surface defining a plurality of gas-permeable first apertures or pores in fluid communication with the at least one first vacuum channel; and
  a second face plate or insert received by the at least one second recess and including a semi-cylindrical second molding surface defining a plurality of gas-permeable second apertures or pores in fluid communication with the at least one second vacuum channel;
  wherein each aperture or pore of the plurality of gas-permeable first apertures or pores and of the plurality of gas-permeable second apertures or pores comprises a maximum width or diameter of no greater than 150 microns;
  wherein the first face plate or insert and the second face plate or insert comprise a non-porous material;
  wherein the plurality of gas-permeable first apertures extend through an entire thickness of the first face plate or insert; and
  wherein the plurality of gas-permeable second apertures extend through an entire thickness of the second face plate or insert; and
  wherein each aperture of the plurality of gas-permeable first apertures and of the plurality of gas-permeable second apertures is bounded by an edge having a non-square corner.

2. The apparatus of claim 1, wherein each aperture or pore of the plurality of gas-permeable first apertures or pores and of the plurality of gas-permeable second apertures or pores comprises a maximum width or diameter in a range of from 10 microns to 100 microns.

3. The apparatus of claim 1, wherein:
  the first face plate or insert and the second face plate or insert comprise sintered porous material;
  the semi-cylindrical first molding surface defines a plurality of gas-permeable first pores; and
  the semi-cylindrical second molding surface defines a plurality of gas-permeable second pores.

4. The apparatus of claim 1, wherein each aperture of the plurality of gas-permeable first apertures and of the plurality of gas-permeable second apertures comprises a maximum length of at least ten times the maximum width.

5. The apparatus of claim 1, wherein a length of each aperture of the plurality of gas-permeable first apertures and of the plurality of gas-permeable second apertures is oriented substantially parallel to a longitudinal axis definable along a center of an imaginary cylinder bounded by the semi-cylindrical first molding surface and the semi-cylindrical second molding surface.

6. The apparatus of claim 1, wherein a length of each aperture of the plurality of gas-permeable first apertures and of the plurality of gas-permeable second apertures is oriented substantially perpendicular to a longitudinal axis definable along a center of an imaginary cylinder bounded by the semi-cylindrical first molding surface and the semi-cylindrical second molding surface.

7. The apparatus of claim 1, wherein:

the plurality of gas-permeable first apertures includes an array of gas-permeable first apertures in the first face plate or insert; and the plurality of gas-permeable second apertures includes an array of gas-permeable second apertures in the second face plate or insert.

8. The apparatus of claim 1, wherein in use of the apparatus including application of subatmospheric pressure condition to vacuum thermoform a heated parison or preform to form the tubular body, the non-square corner of the edge of each aperture is configured to impart a witness feature having a maximum lengthwise dimension non-parallel to a longitudinal axis of the tubular body and having a height in a range of from 0 mm to 0.02 mm.

9. A method for producing a pipette using the apparatus of claim 1, the method comprising:

inserting a parison or preform into a mold bounded by the semi-cylindrical first molding surface and the semi-cylindrical second molding surface, the parison or preform having a longitudinal axis and a curved inner surface enclosing a space; and applying subatmospheric pressure to the at least one first vacuum channel and to the at least one second vacuum channel, and vacuum forming the parison or preform to conform to the semi-cylindrical first and second molding surfaces, thereby producing a hollow tubular body of the pipette.

10. The method of claim 9, further comprising extruding a polymer melt to form the parison or preform.

11. An apparatus for vacuum forming a hollow tubular body of a pipette, the apparatus comprising:

a first mold body comprising a plurality of first mold body sections defining a semi-cylindrical first molding surface and defining a plurality of first vacuum passages extending through the semi-cylindrical first molding surface, wherein each first mold body section of the plurality of first mold body sections is arranged in contact with an adjacent at least one other first mold body section of the plurality of first mold body sections, and wherein a portion of each first mold body section is separated from the adjacent at least one other first mold body section by a different first vacuum passage of the plurality of first vacuum passages; and a second mold body comprising a plurality of second mold body sections defining a semi-cylindrical second molding surface and defining a plurality of second vacuum passages extending through the semi-cylindrical second molding surface, wherein each second mold body section of the plurality of second mold body sections is arranged in contact with an adjacent at least one other second mold body section of the plurality of second mold body sections, and wherein a portion of each second mold body section is separated from the adjacent at least one other second mold body section by a different second vacuum passage of the plurality of second vacuum passages;

wherein the second mold body is configured to cooperate with the first mold body to cause the semi-cylindrical first molding surface and the semi-cylindrical second molding surface to form a substantially continuous molding surface;

wherein each first vacuum passage of the plurality of first vacuum passages and each second vacuum passage of the plurality of second vacuum passages comprises a maximum width of no greater than 150 microns, and comprises a maximum length of at least ten times the maximum width; and wherein each first vacuum passage of the plurality of first vacuum passages and each second vacuum passage of the plurality of second vacuum passages is bounded by an edge having a non-square corner.

12. The apparatus of claim 11, wherein each first vacuum passage of the plurality of first vacuum passages and each second vacuum passage of the plurality of second vacuum passages comprises a maximum width in a range of from 10 microns to 100 microns.

13. The apparatus of claim 11, wherein:

first mold body sections of the plurality of first mold body sections are joined or compressively retained against one another to form the first mold body; and second mold body sections of the plurality of second mold body sections are joined or compressively retained against one another to form the second mold body.

14. The apparatus of claim 11, wherein:

a longitudinal axis is definable along a center of an imaginary cylinder bounded by the semi-cylindrical first molding surface and by the semi-cylindrical second molding surface;

each first mold body section of the plurality of first mold body sections and each second mold body section of the plurality of second mold body sections includes a length oriented substantially parallel to the longitudinal axis; and each first vacuum passage of the plurality of first vacuum passages and each second vacuum passage of the plurality of second vacuum passages includes a length extending substantially parallel to the longitudinal axis and extending substantially perpendicular to the maximum width.

15. The apparatus of claim 11, wherein:

a longitudinal axis is definable along a center of an imaginary cylinder bounded by the semi-cylindrical first molding surface and by the semi-cylindrical second molding surface;

each first mold body section of the plurality of first mold body sections and each second mold body section of the plurality of second mold body sections includes a length oriented substantially perpendicular to the longitudinal axis; and each first vacuum passage of the plurality of first vacuum passages and each second vacuum passage of the plurality of second vacuum passages includes a length extending substantially perpendicular to the longitudinal axis and extending substantially parallel to the maximum width.

16. A method for producing a pipette using the apparatus of claim 11, the method comprising:

inserting a parison or preform into a mold bounded by the semi-cylindrical first molding surface and the semi-cylindrical second molding surface, the parison or preform having a longitudinal axis and a curved inner surface enclosing a space; and applying subatmospheric pressure to the plurality of first vacuum passages and to the plurality of second vacuum passages, and vacuum forming the parison or preform to conform to the semi-cylindrical first and second molding surfaces, thereby producing a hollow tubular body of the pipette.

17. The method of claim 16, further comprising extruding a polymer melt to form the parison or preform.

\* \* \* \* \*